(12) United States Patent
Fitzgerald et al.

(10) Patent No.: US 11,151,749 B2
(45) Date of Patent: *Oct. 19, 2021

(54) IMAGE COMPRESSION METHOD AND APPARATUS

(71) Applicant: Immersive Robotics Pty Ltd, Fortitude Valley (AU)

(72) Inventors: Daniel Liam Fitzgerald, Queensland (AU); Timothy Simon Lucas, Fortitude Valley (AU)

(73) Assignee: IMMERSIVE ROBOTICS PTY LTD., Queensland (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,267

(22) Filed: Mar. 27, 2020

(65) Prior Publication Data

US 2020/0226795 A1  Jul. 16, 2020

Related U.S. Application Data

(63) Continuation of application No. 16/310,756, filed as application No. PCT/AU2017/050594 on Jun. 14, 2017, now Pat. No. 10,657,674.

(Continued)

(30) Foreign Application Priority Data

Dec. 7, 2016 (AU) .................. 2016905048

(51) Int. Cl.
  *G06T 9/00* (2006.01)
  *G06F 3/01* (2006.01)
  *G06F 3/14* (2006.01)

(52) U.S. Cl.
  CPC .............. *G06T 9/00* (2013.01); *G06F 3/013* (2013.01); *G06F 3/14* (2013.01); *G06T 2200/16* (2013.01)

(58) Field of Classification Search
  CPC combination set(s) only.
  See application file for complete search history.

(56) References Cited

U.S. PATENT DOCUMENTS 4,504,263 A   3/1985  Steuer
5,325,125 A   6/1994  Naimpally
(Continued)

FOREIGN PATENT DOCUMENTS

CA    2798300 A1    6/2014
EP   1 720 356 A1   8/2006
(Continued)

OTHER PUBLICATIONS

PCT Search Report for PCT/AU2017/050594 entitled Image Compression Method and Apparatus filed Jun. 14, 2017 in the name of Immersive Robotics Pty Ltd (Queensland, AU) dated Aug. 17, 2017.

(Continued)

*Primary Examiner* — Wesner Sajous
(74) *Attorney, Agent, or Firm* — Fish IP Law, LLP

(57) ABSTRACT

A method of compressing image data from one or more images forming part of the digital reality content, the method including obtaining pixel data from the image data, the pixel data representing an array of pixels within the one or more images; determining a position of the array of pixels within the one or more images relative to a defined position, the defined position being at least partially indicative of a point of gaze of the user, and compressing the pixel data at least partially in accordance to the determined position so that a degree of compression depends on the determined position of the array of pixels.

20 Claims, 14 Drawing Sheets

Related U.S. Application Data

(60) Provisional application No. 62/351,738, filed on Jun. 17, 2016.

(56) References Cited

U.S. PATENT DOCUMENTS

| | | | |
|---|---|---|---|
| 5,559,557 A | 9/1996 | Kato | |
| 5,703,793 A * | 12/1997 | Wise | G06F 13/16 382/232 |
| 5,909,250 A | 6/1999 | Hardiman | |
| 5,963,673 A | 10/1999 | Kodama | |
| 6,078,349 A | 6/2000 | Molloy | |
| 6,091,777 A | 7/2000 | Guetz et al. | |
| 6,101,284 A * | 8/2000 | Matsubara | H04N 19/63 358/426.02 |
| 6,233,590 B1 | 5/2001 | Shaw et al. | |
| 6,249,614 B1 | 6/2001 | Kolesnik | |
| 6,252,989 B1 | 6/2001 | Geisler | |
| 6,259,991 B1 | 7/2001 | Nysen | |
| 6,310,962 B1 | 10/2001 | Chung | |
| 6,353,685 B1 | 3/2002 | Wu et al. | |
| 7,027,655 B2 | 4/2006 | Keeney et al. | |
| 7,689,047 B2 | 3/2010 | Bahar | |
| 7,692,642 B2 | 4/2010 | Wyatt | |
| 7,734,105 B2 | 6/2010 | Strom | |
| 7,904,117 B2 | 3/2011 | Doan et al. | |
| 8,098,941 B2 | 1/2012 | Moussavi | |
| 8,184,069 B1 | 5/2012 | Rhodes | |
| 8,366,552 B2 | 2/2013 | Perlman et al. | |
| 8,369,324 B1 | 2/2013 | Breight et al. | |
| 8,374,242 B1 | 2/2013 | Lewis | |
| 8,416,847 B2 | 4/2013 | Roman | |
| 8,787,454 B1 | 7/2014 | Chechik et al. | |
| 9,367,499 B2 | 6/2016 | Yun et al. | |
| 9,596,053 B1 | 3/2017 | Marupaduga et al. | |
| 9,648,346 B2 | 5/2017 | Zhang et al. | |
| 9,665,332 B2 | 5/2017 | Otsuka | |
| 9,811,874 B2 | 11/2017 | Narayanan et al. | |
| 10,155,160 B2 | 12/2018 | Van Der Laan et al. | |
| 10,237,577 B2 * | 3/2019 | Jeong | H04N 19/126 |
| 10,657,674 B2 | 5/2020 | Fitzgerald | |
| 2002/0090140 A1 | 7/2002 | Thirsk | |
| 2002/0154693 A1 | 10/2002 | Demos et al. | |
| 2003/0138150 A1 | 7/2003 | Srinivasan | |
| 2005/0018911 A1 | 1/2005 | Deever | |
| 2006/0195464 A1 | 8/2006 | Guo | |
| 2007/0263938 A1 | 11/2007 | Lee | |
| 2008/0055318 A1 | 3/2008 | Glen | |
| 2008/0211901 A1 | 9/2008 | Civanlar et al. | |
| 2008/0266410 A1 | 10/2008 | Fukuhara | |
| 2009/0033588 A1 | 2/2009 | Kajita et al. | |
| 2010/0093282 A1 | 4/2010 | Martikkala et al. | |
| 2010/0124279 A1 | 5/2010 | Reddy et al. | |
| 2011/0038556 A1 | 2/2011 | Mathe | |
| 2012/0206452 A1 | 8/2012 | Geisner et al. | |
| 2012/0314026 A1 | 12/2012 | Chen et al. | |
| 2013/0040682 A1 | 2/2013 | Chang et al. | |
| 2013/0215961 A1 * | 8/2013 | Nakagawa | H04N 19/126 375/240.03 |
| 2014/0022125 A1 | 1/2014 | Zhu et al. | |
| 2014/0118398 A1 | 5/2014 | Hall | |
| 2014/0128032 A1 | 5/2014 | Muthukumar | |
| 2014/0184475 A1 | 7/2014 | Tantos | |
| 2014/0218236 A1 | 8/2014 | Sadeghi et al. | |
| 2014/0357993 A1 | 12/2014 | Hiriyannaiah et al. | |
| 2015/0031296 A1 | 1/2015 | Holman et al. | |
| 2015/0172545 A1 | 6/2015 | Szabo et al. | |
| 2015/0237351 A1 | 8/2015 | Lee et al. | |
| 2015/0279103 A1 | 10/2015 | Naegle et al. | |
| 2016/0127490 A1 | 5/2016 | Li | |
| 2016/0248995 A1 | 8/2016 | Mullins et al. | |
| 2016/0267884 A1 | 9/2016 | Binstock et al. | |
| 2016/0381398 A1 | 12/2016 | Saxena et al. | |
| 2017/0051171 A1 | 2/2017 | Adamic et al. | |
| 2017/0060678 A1 | 3/2017 | Jeganathan et al. | |
| 2017/0069227 A1 | 3/2017 | Dialameh et al. | |
| 2017/0072483 A1 | 3/2017 | Gamble | |
| 2017/0072484 A1 | 3/2017 | Baratta | |
| 2017/0075416 A1 | 3/2017 | Armstrong | |
| 2017/0085462 A1 | 3/2017 | Zhou et al. | |
| 2017/0085872 A1 | 3/2017 | Perron | |
| 2017/0098231 A1 | 4/2017 | Dietrich | |
| 2017/0103571 A1 | 4/2017 | Beaurepaire | |
| 2017/0150147 A1 | 5/2017 | Forsyth et al. | |
| 2017/0191429 A1 | 7/2017 | Tylutki et al. | |
| 2017/0207971 A1 | 7/2017 | Kripalani et al. | |
| 2017/0221182 A1 | 8/2017 | Cawley et al. | |
| 2017/0236252 A1 | 8/2017 | Nguyen | |
| 2017/0285735 A1 | 10/2017 | Young et al. | |
| 2017/0352322 A1 | 12/2017 | Spence et al. | |
| 2018/0046892 A1 | 2/2018 | Hyde et al. | |
| 2018/0055332 A1 | 3/2018 | Lee et al. | |
| 2018/0082904 A1 | 3/2018 | Basker et al. | |
| 2018/0093177 A1 | 4/2018 | Tokubo | |
| 2018/0095529 A1 | 4/2018 | Tokubo | |
| 2018/0146198 A1 | 5/2018 | Atluru | |
| 2018/0211287 A1 | 7/2018 | Byron et al. | |
| 2018/0224841 A1 | 8/2018 | Tani et al. | |
| 2018/0224842 A1 | 8/2018 | Ichimura | |
| 2018/0229458 A1 | 8/2018 | Thallner et al. | |
| 2018/0229462 A1 | 8/2018 | Shimada et al. | |
| 2018/0268571 A1 | 9/2018 | Park | |
| 2018/0357809 A1 | 12/2018 | Lawless et al. | |
| 2019/0019315 A1 | 1/2019 | Bastani et al. | |
| 2019/0025760 A1 | 1/2019 | Ashrafi et al. | |
| 2019/0033058 A1 | 1/2019 | Tsurumi | |
| 2019/0122436 A1 | 4/2019 | Bashkirov et al. | |
| 2019/0378305 A1 | 12/2019 | Fitzgerald | |

FOREIGN PATENT DOCUMENTS

| | | |
|---|---|---|
| EP | 1892965 A2 | 2/2008 |
| EP | 3013053 A2 | 4/2016 |
| EP | 3313144 A1 | 4/2018 |
| EP | 3336685 A3 | 9/2018 |
| GB | 2450422 A | 12/2008 |
| GB | 2478583 A | 9/2011 |
| GB | 2480825 A | 12/2011 |
| GB | 2484736 A | 4/2012 |
| GB | 2485613 A | 5/2012 |
| GB | 2485977 A | 6/2012 |
| GB | 2486411 A | 6/2012 |
| GB | 2486412 A | 6/2012 |
| GB | 2486431 A | 6/2012 |
| GB | 2486434 A | 6/2012 |
| GB | 2486457 A | 6/2012 |
| GB | 2488094 A | 8/2012 |
| GB | 2538797 B | 9/2019 |
| JP | 2011508995 A | 3/2011 |
| JP | 2012531268 A | 9/2012 |
| JP | 2019041394 A | 3/2019 |
| KR | 20160109066 A | 9/2016 |
| TW | I334716 B | 12/2010 |
| WO | WO-2004014077 A1 | 2/2004 |
| WO | WO-2005083558 A1 | 9/2005 |
| WO | WO-2007020408 A1 | 2/2007 |
| WO | WO-2009007693 A2 | 1/2009 |
| WO | WO-2009013499 A2 | 1/2009 |
| WO | WO-2009073824 A1 | 6/2009 |
| WO | WO-2010111100 A1 | 9/2010 |
| WO | WO-2010114512 A1 | 10/2010 |
| WO | WO-2010136781 A1 | 12/2010 |
| WO | WO-2010138124 A1 | 12/2010 |
| WO | WO-2010144096 A1 | 12/2010 |
| WO | WO-2011022014 A1 | 2/2011 |
| WO | WO-2012056198 A1 | 5/2012 |
| WO | WO-2012066292 A1 | 5/2012 |
| WO | WO2012177378 A2 | 12/2012 |
| WO | WO-2014096791 A1 | 6/2014 |
| WO | WO-2014177869 A1 | 11/2014 |
| WO | WO-2014195673 A1 | 12/2014 |
| WO | WO-2014207439 A1 | 12/2014 |
| WO | WO-2015079215 A1 | 6/2015 |
| WO | WO-2015092356 A1 | 6/2015 |

(56) References Cited

FOREIGN PATENT DOCUMENTS

| WO | WO-2015150727 A1 | 10/2015 |
| WO | WO-2015180663 A1 | 12/2015 |
| WO | WO-2016016607 A1 | 2/2016 |
| WO | WO-2016071670 A2 | 5/2016 |
| WO | WO-2016097689 A1 | 6/2016 |
| WO | WO-2016097694 A1 | 6/2016 |
| WO | WO-2016110679 A1 | 7/2016 |
| WO | WO-2016135441 A1 | 9/2016 |
| WO | WO-2016142713 A1 | 9/2016 |
| WO | WO-2016146992 A1 | 9/2016 |
| WO | WO-2016151291 A1 | 9/2016 |
| WO | WO-2016156801 A1 | 10/2016 |
| WO | WO-2016174392 A1 | 11/2016 |
| WO | WO-2016189294 A1 | 12/2016 |
| WO | WO-2017021687 A1 | 2/2017 |
| WO | WO-2017051171 A1 | 3/2017 |
| WO | WO-2017060678 A1 | 4/2017 |
| WO | WO-2017072483 A1 | 5/2017 |
| WO | WO-2017072484 A1 | 5/2017 |
| WO | WO-2017085462 A1 | 5/2017 |
| WO | WO-2017098231 A1 | 6/2017 |
| WO | WO-2017103571 A1 | 6/2017 |
| WO | WO-2017191429 A1 | 11/2017 |
| WO | WO-2017207971 A1 | 12/2017 |
| WO | WO-2017214671 A1 | 12/2017 |
| WO | WO-2018046892 A1 | 3/2018 |
| WO | WO-2018055332 A1 | 3/2018 |
| WO | WO-2018082904 A1 | 5/2018 |
| WO | WO-2018145153 A1 | 8/2018 |
| WO | WO-2018145154 A1 | 8/2018 |
| WO | WO-2018200993 A1 | 11/2018 |
| WO | WO-2018211287 A1 | 11/2018 |
| WO | WO-2018223179 A1 | 12/2018 |
| WO | WO-2018224841 A1 | 12/2018 |
| WO | WO-2018224842 A1 | 12/2018 |
| WO | WO-2018229458 A1 | 12/2018 |
| WO | WO-2018229462 A1 | 12/2018 |
| WO | WO-2019025760 A1 | 2/2019 |
| WO | WO-2019100108 A1 | 5/2019 |
| WO | WO-2019100109 A1 | 5/2019 |

OTHER PUBLICATIONS

Farid et al., "Adaptive Wavelet Eye-Gaze Based Video Compression", Proceedings of SPIE, vol. 4877, published 2003, 9 pages).
Yao et al., "A novel color image compression algorithm using the human visual contrast sensitivity characteristics", Photonic Sensors, vol. 7, No. 1, 2017, pp. 72-81.
European Search Report; Immersive Robotics Pty Ltd; IveJan. 28, 2020; App. No. 17812313.9, pp. 1-10.
Taylor, Clark N.; et al. "Adaptive Image Compression for Wireless Multimedia Communication," University of California San Diego. 5 Pages.
Behnam Bastani, et al., "Strategies for Foveated Compression and Transmission," Symposium for Information Display, Palisades Convention Management, Inc., 2017, 4 pages.
Examination Report for European Application No. 17812313.9 dated Nov. 5, 2020, 6 pages.
Extended European Search Report for European Application No. 18750982.3 dated Oct. 21, 2020, 28 pages.
Extended European Search Report for European Application No. 18751812.1 dated Sep. 24, 2020, 19 pages.
Extended European Search Report for European Application No. 18813535.4 dated Oct. 26, 2020, 9 pages.
International Preliminary Report on Patentability for Application No. PCT/AU2017/050594 dated Dec. 27, 2018, 14 pages.
International Preliminary Report on Patentability for Application No. PCT/AU2018/050090 dated Aug. 22, 2019, 7 pages.
International Preliminary Report on Patentability for Application No. PCT/AU2018/050091 dated Aug. 22, 2019, 5 pages.
International Preliminary Report on Patentability for Application No. PCT/AU2018/050534 dated Dec. 19, 2019, 8 pages.
International Preliminary Report on Patentability for Application No. PCT/AU2018/051237 dated Jun. 4, 2020, 8 pages.
International Preliminary Report on Patentability for Application No. PCT/AU2018/051239 dated Jun. 4, 2020, 13 pages.
International Search Report and Written Opinion for Application No. PCT/AU2018/050090 dated Apr. 6, 2018, 11 pages.
International Search Report and Written Opinion for Application No. PCT/AU2018/050091 dated Apr. 6, 2018, 10 pages.
International Search Report and Written Opinion for Application No. PCT/AU2018/051239 dated Feb. 4, 2019, 15 pages.
International Search report for Application No. PCT/AU2018/050534 dated Aug. 17, 2018, 13 pages.
International Search Report for Application No. PCT/AU2018/051237 dated Jan. 30, 2019, 4 pages.
Search Information Statement for Application No. PCT/AU2018/051237 dated Jan. 30, 2019, 1 page.
Written Opinion for Application No. PCT/AU2017/050594 dated Aug. 17, 2017, 12 pages.
Written Opinion for Application No. PCT/AU2018/050534 dated Aug. 17, 2018, 6 pages.
Written Opinion for Application No. PCT/AU2018/051237 dated Jan. 30, 2019, 6 pages.
Anderson G.B., et al., "Piecewise Fourier Transformation for Picture Bandwidth Compression," IEEE Transactions on Communication Technology, Apr. 1, 1971, vol. 19 (2), pp. 133-140, XP011218516.
Examination Opinions for Taiwan Patent Application No. 106119982 dated Feb. 3, 2021, 99 pages.
Extended European Search Report for European Application No. 18880508.9 dated Feb. 25, 2021, 8 pages.
International Search Report and Written Opinion for Application No. PCT/AU2020/051115 dated Nov. 17, 2020, 12 pages.
European Search Report for European Patent Application No. 1 8881879.3-1208, dated Jun. 24, 2021, 10 pages.

* cited by examiner

IMAGE COMPRESSION METHOD AND APPARATUS

BACKGROUND OF THE INVENTION

The present invention relates to a method and apparatus for compressing or decompressing image data, and in one particular example for compressing or decompressing image data to allow for transmission of the image data with a reduced bandwidth and low latency.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In virtual, augmented and mixed reality systems, it is typical to provide a wearable display device, such as a Head Mounted Display (HMD), which is displays information to a wearer based on the relative spatial position and/or orientation of the display device. Such systems operate by generating images based on information regarding the pose (position and orientation) of the display device, so that as the display device moves, the images are updated to reflect the new pose of the display device.

In order to avoid motion sickness, it is important that the time difference between collection of the pose information and creation of the corresponding image is minimised, particularly in circumstances where the display device is moving rapidly. This, coupled with the need to generate high resolution images so that these appear as lifelike as possible, means that significant processing hardware is required. As a result, high end existing systems typically require a static desktop computer with a high bandwidth and low latency connection to the display device. Consequently, current systems such as the HTC Vive™, Oculus Rift™ and Playstation VR™ require a wired connection between the computer and the HMD, which is inconvenient.

Whilst mobile solutions are available, such as the Gear VR™, which incorporates a mobile phone to perform the processing and display of images within the HMD itself, the processing ability is limited, meaning the content that can be displayed is restricted, particularly in terms of the image resolution and quality.

It is known to compress image data so as to reduce the data volume. This is useful in many applications, such as reduce the storage capacity required to store the image data, or to reduce bandwidth requirements associated with transmission of the image data.

JPEG uses a lossy form of compression based on the discrete cosine transform (DCT). This mathematical operation converts each frame/field of the video source from the spatial (2D) domain into the frequency domain (a.k.a. transform domain). A perceptual model based loosely on the human psychovisual system discards high-frequency information, i.e. sharp transitions in intensity, and color hue. In the transform domain information is reduced through quantization. The quantized coefficients are then sequenced and losslessly packed into an output bitstream.

However, such approaches often only achieve a limited amount of compression and require significant processing time, making these unsuitable for use in low latency applications, such as virtual or augmented reality, telepresence or the like.

SUMMARY OF THE PRESENT INVENTION

In one broad form an aspect of the present invention seeks to provide a method of compressing image data from one or more images forming part of digital reality content, the method including: obtaining pixel data from the image data, the pixel data representing an array of pixels within the one or more images; determining a position of the array of pixels within the one or more images relative to a defined position, the defined position being at least partially indicative of a point of gaze of the user; and compressing the pixel data to generate compressed image data, the pixel data being compressed at least partially in accordance the determined position so that a degree of compression depends on the determined position of the array of pixels.

In one embodiment the defined position is at least one of: a measured point of gaze of the user; an expected point of gaze of the user; offset from a measured point of gaze of the user; offset from an expected point of gaze of the user; and, determined at least partially in accordance with gaze data indicative of a point of gaze of the user, the gaze data being obtained from a gaze tracking system.

In one embodiment the method includes compressing the pixel data so that the degree of compression at least one of: is based on a distance from the defined point; is based on a direction relative to the defined point; increases further from the defined point; and, provides foveated compression.

In one embodiment the method includes: selecting one of a plurality of encoding schemes; and, encoding the pixel data using the selected encoding scheme.

In one embodiment each of the encoding schemes provides a respective degree of compression, and wherein the method includes selecting the encoding scheme at least in part depending on at least one of: a desired degree of compression; and, the position of the array of pixels.

In one embodiment the method includes: determining an encoding code indicative of the encoding scheme used; and, generating compressed image data using the encoding code and encoded pixel data.

In one embodiment the method includes, using an encoding scheme that compresses the pixel data by: applying a transformation to the pixel data to determine a set of frequency coefficients indicative of frequency components of the array of pixels; selectively encoding at least some of the frequency coefficients using a bit encoding scheme to thereby generate a set of encoded frequency coefficients; and, generating compressed image data using the encoded frequency coefficients.

In one embodiment the bit encoding scheme defines the number of bits used to encode each of the frequency coefficients, and wherein the frequency coefficients are selectively encoded so that at least one of: at least some of the encoded frequency coefficients have different numbers of bits; a smaller number of bits are used to encode frequency coefficients corresponding to higher frequencies; a progressively smaller number of bits are used to encode frequency coefficients corresponding to progressively higher frequencies; at least one frequency coefficient is discarded so that the set of encoded frequency coefficients is smaller than the set of frequency coefficients; and, at least one frequency coefficient is discarded corresponding to higher frequencies.

In one embodiment the method includes: selecting one of a plurality of bit encoding schemes; and, encoding the frequency coefficients in accordance with the selected bit encoding scheme.

In one embodiment each of the plurality of bit encoding schemes selectively encodes different frequency coefficients with respective different numbers of bits to provide a different degree of compression.

In one embodiment the bit encoding scheme is selected at least in part depending on at least one of: a desired degree of compression; and, the position of the array of pixels.

In one embodiment the frequency components are arranged in a plurality of levels and wherein each bit encoding scheme defines a respective number of bits to be used to encode the frequency coefficients in each of the plurality of levels.

In one embodiment the array is an N×N array of pixels resulting in 2N-1 levels of frequency components.

In one embodiment the method includes applying a scaling factor to at least some of the frequency coefficients so that scaled frequency coefficients are encoded, the scaling factor being used to reduce a magnitude of each frequency coefficient and wherein at least one of: different scaling factors are applied to at least some frequency coefficients; the same scaling factor is applied to each frequency coefficient; and, a different scaling factor is applied to frequency coefficients in a different channel.

In one embodiment the image data defines a plurality of channels, and wherein the method includes selectively encoding frequency coefficients for each channel.

In one embodiment the pixel data defines RGB channels, and wherein the method includes: converting the RGB channels into YCbCr channels; and, transforming the YCbCr channels.

In one embodiment the method includes at least one of: selectively encoding more frequency coefficients for the Y channel than the Cb or Cr channels; selectively encoding frequency coefficients for the YCbCr channels in parallel; and, selectively encoding frequency coefficients for the CbCr channels and using the Y channel.

In one embodiment the transformation is a 2-D discrete cosine transformation.

In one embodiment the method includes obtaining pixel data from image data by: buffering image data corresponding to a next n-1 rows of pixels of the image; buffering image data for a next n pixels of the next row of pixels; obtaining pixel data for a next n×n block of pixels from the buffered image data; repeating steps b) and c) until pixel data has been obtained from all of the n rows of pixels; and, repeating steps a) to d) until pixel data has been obtained from each row of pixels of the image.

In one embodiment n is selected based on at least one of: a selected bit encoding scheme; a desired degree of compression; and, the position of the array of pixels.

In one embodiment the method includes: selectively encoding frequency coefficients in parallel; and, generating compressed image data at least in part by parallel to serial byte encoding.

In one broad form an aspect of the present invention seeks to provide a method of decompressing compressed image data from one or more images forming part of digital reality content, the method including: obtaining compressed image data, the compressed image data representing an array of pixels within the one or more images and being compressed at least in part based on a position of the array of pixels within the one or more images relative to a defined position, the defined position being at least partially indicative of a point of gaze of the user; and, decompressing the compressed image data at least partially in accordance the determined position.

In one embodiment the defined position is at least one of: a measured point of gaze of the user; an expected point of gaze of the user; offset from a measured point of gaze of the user; offset from an expected point of gaze of the user; and, determined at least partially in accordance with gaze data indicative of a point of gaze of the user, the gaze data being obtained from a gaze tracking system.

In one embodiment the method includes: selecting one of a plurality of decoding schemes; and, decoding the pixel data using the selected decoding scheme.

In one embodiment the method includes selecting the decoding scheme at least in part depending on at least one of: a desired degree of compression; a position of the array of pixels; and, an encoding code indicative of the encoding scheme used, the encoding code being determined from the compressed image data.

In one embodiment the method includes, using a decoding scheme that decompresses compressed image data by: determining a set of encoded frequency coefficients from the compressed image data in accordance with a bit encoding scheme that defines the number of bits used in each encoded frequency coefficient; performing bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients; and, applying an inverse transformation to the set of frequency coefficients to determine pixel data representing an array of pixels within the one or more images.

In one embodiment the bit encoding scheme defines the number of bits used to encode each of the frequency coefficients, the bit encoding scheme uses a smaller number of bits to encode frequency coefficients corresponding to higher frequencies and wherein the method includes generating at least some of the frequency coefficients corresponding to higher frequencies.

In one embodiment the method includes: selecting one of a plurality of bit encoding schemes; and, decoding the encoded frequency coefficients in accordance with the selected bit encoding scheme.

In one embodiment each of the plurality of bit encoding schemes selectively encodes different frequency coefficients with respective different numbers of bits to provide a different degree of compression.

In one embodiment the bit encoding scheme is selected at least in part depending on at least one of: an encoding code; the bit encoding scheme used to generate the compressed image data; and, the position of the array of pixels.

In one embodiment the frequency components are arranged in a plurality of levels and wherein each bit encoding scheme defines a respective number of bits to be used to encode the frequency coefficients in each of the plurality of levels.

In one embodiment the array is an N×N array of pixels resulting in 2N-1 levels of frequency components.

In one embodiment the method includes applying a scaling factor to at least some of the frequency coefficients so that scaled encoded frequency coefficients are decoded, the scaling factor being used to increase a magnitude of each frequency coefficient and wherein at least one of: different scaling factors are applied to at least some encoded frequency coefficients; the same scaling factor is applied to each encoded frequency coefficient; and, a different scaling factor is applied to encoded frequency coefficients in a different channel.

In one embodiment the image data defines a plurality of channels, and wherein the method includes selectively decoding encoded frequency coefficients for each channel.

In one embodiment the compressed image data defines YCbCr channels, and wherein the method includes: performing an inverse transform of the YCbCr channels; and, converting the transformed YCbCr channels into RGB channels.

In one embodiment the method includes at least one of: generating more frequency coefficients for the Cb or Cr channels than the Y channel; decoding the encoded YCbCr channels in parallel; and, decoding the CbCr channels and converting the decoded CbCr channels and the Y channel into RGB channels.

In one embodiment the inverse transformation is an inverse 2-D discrete cosine transformation.

In one embodiment the method includes: decoding compressed image data at least in part by serial to parallel byte decoding; and, selectively decoding frequency coefficients in parallel.

In one embodiment the desired degree of compression is determined based on at least one of: the position of the array of pixels; a transmission bandwidth of a communications link used to transmit the compressed image data; a transmission quality of service of a communications link used to transmit the compressed image data; movement of a display device; image display requirements; a target display resolution; a channel being processed; and, error metrics.

In one embodiment the digital reality is at least one of: augmented reality; virtual reality; mixed reality; and, telepresence.

In one embodiment the method is used for transmitting the image data from a computing device to a wearable digital reality headset via at least one of: a communication network; and, a wireless communications link.

In one broad form an aspect of the present invention seeks to provide apparatus for compressing image data from one or more images forming part of digital reality content, the apparatus including at least one electronic encoder processing device that: obtains pixel data from the image data, the pixel data representing an array of pixels within the one or more images; determines a position of the array of pixels within the one or more images relative to a defined position, the defined position being at least partially indicative of a point of gaze of the user; and compresses the image data at least partially in accordance the determined position so that a degree of compression depends on the determined position of the array of pixels.

In one broad form an aspect of the present invention seeks to provide apparatus for decompressing compressed image data from one or more images forming part of digital reality content, the apparatus including at least one electronic decoder processing device that: obtains compressed image data, the compressed image data representing an array of pixels within the one or more images and being compressed at least in part based on a position of the array of pixels within the one or more images relative to a defined position, the defined position being at least partially indicative of a point of gaze of the user; and, decompresses the compressed image data at least partially in accordance the determined position.

In one broad form an aspect of the present invention seeks to provide a method of compressing image data representing one or more images, the method including: obtaining pixel data from the image data, the pixel data representing an array of pixels within the one or more images; applying a transformation to the pixel data to determine a set of frequency coefficients indicative of frequency components of the array of pixels; selectively encoding at least some of the frequency coefficients using a bit encoding scheme to thereby generate a set of encoded frequency coefficients, wherein the bit encoding scheme defines the number of bits used to encode each of the frequency coefficients so that when the frequency coefficients are selectively encoded: at least some of the encoded frequency coefficients are encoded with a different numbers of bits; and, at least one frequency coefficient is discarded so that the set of encoded frequency coefficients is smaller than the set of frequency coefficients; and, generating compressed image data using the encoded frequency coefficients.

In one embodiment the frequency coefficients are selectively encoded so that at least one of: a number of bits used to encode each frequency coefficient is defined irrespective of the value of the respective frequency coefficient; a smaller number of bits are used to encode frequency coefficients corresponding to higher frequencies; a progressively smaller number of bits are used to encode frequency coefficients corresponding to progressively higher frequencies; at least one frequency coefficient is discarded corresponding to higher frequencies.

In one embodiment the method includes applying a scaling factor to at least some of the frequency coefficients so that scaled frequency coefficients are encoded and wherein at least one of: different scaling factors are applied to at least some frequency coefficients; the same scaling factor is applied to each frequency coefficient; and, the scaling factor is used to reduce a magnitude of each frequency coefficient.

In one embodiment the method includes: selecting one of a plurality of encoding schemes; and, encoding the pixel data using the selected encoding scheme.

In one embodiment each of the encoding schemes provides a respective degree of compression, and wherein the method includes selecting the encoding scheme at least in part depending on at least one of: a desired degree of compression; and, the position of the array of pixels.

In one embodiment the method includes selectively encoding frequency coefficients in accordance with at least one of: selection rules; a desired degree of compression; and, a position of the array of pixels in the one or more images.

In one embodiment the method includes: selecting one of a plurality of bit encoding schemes; and, encoding the frequency coefficients in accordance with the selected bit encoding scheme.

In one embodiment each of the plurality of bit encoding schemes selectively encodes different frequency coefficients with respective different numbers of bits to provide a different degree of compression.

In one embodiment the bit encoding scheme is selected at least in part depending on at least one of: selection rules; a desired degree of compression; and, the position of the array of pixels.

In one embodiment the method includes selecting the bit encoding scheme based on at least one of: a transmission bandwidth of a communications link used to transmit the compressed image data; a transmission quality of service of a communications link used to transmit the compressed image data; movement of a display device; image display requirements; a target display resolution; a channel being processed; a position of the array of pixels within the one or more images; a position of the array of pixels within the one or more images relative to a point of gaze of an observer of the one or more images; and, error metrics.

In one embodiment the frequency components are arranged in a plurality of levels and wherein each bit encoding scheme defines a respective number of bits to be used to encode the frequency coefficients in each of the plurality of levels.

In one embodiment the array is an N×N array of pixels resulting in 2N-1 levels of frequency components.

In one embodiment the method includes: determining a point of gaze of an observer of the one or more images; selectively encoding frequency coefficients at least partially in accordance with the point of gaze.

In one embodiment the method includes: determining a distance between the point of gaze and a position of the array of pixels in the one or more images; and, selectively encoding frequency coefficients in accordance with the distance so that less frequency coefficients are encoded for greater distances.

In one embodiment the image data defines a plurality of channels, and wherein the method includes selectively encoding frequency coefficients for each channel.

In one embodiment the pixel data defines RGB channels, and wherein the method includes: converting the RGB channels into YCbCr channels; and, transforming the YCbCr channels.

In one embodiment the method includes at least one of: selectively encoding more frequency coefficients for the Y channel than the Cb or Cr channels; selectively encoding more frequency coefficients for the YCbCr channels in parallel; and, generating the compressed image data by: encoding the CbCr channels; and using the Y channel.

In one embodiment the transformation is a 2-D discrete cosine transformation.

In one embodiment the method includes obtaining the pixel data from a video feed.

In one embodiment the method includes obtaining pixel data from image data by: buffering image data corresponding to a next n-1 rows of pixels of the image; buffering image data for a next n pixels of the next row of pixels; obtaining pixel data for a next n×n block of pixels from the buffered image data; repeating steps b) and c) until pixel data has been obtained from all of the n rows of pixels; and, repeating steps a) to d) until pixel data has been obtained from each row of pixels of the image.

In one embodiment n is selected based on at least one of: selection rules; a selected bit encoding scheme; and, the position of the array of pixels.

In one embodiment the method includes: selectively encoding frequency coefficients in parallel; and, generating compressed image data at least in part by parallel to serial byte encoding.

In one broad form an aspect of the present invention seeks to provide apparatus for compressing image data representing one or more images, the apparatus including at least one electronic encoder processing device that: obtains pixel data from the image data, the pixel data representing an array of pixels within the one or more images; applies a transformation to the pixel data to determine a set of frequency coefficients indicative of frequency components of the array of pixels; selectively encodes at least some of the frequency coefficients using a bit encoding scheme to thereby generate a set of encoded frequency coefficients, wherein the bit encoding scheme defines the number of bits used to encode the frequency coefficients, and wherein the frequency coefficients are selectively encoded so that: at least some of the encoded frequency coefficients have different numbers of bits; and, at least one frequency coefficient is discarded so that the set of encoded frequency coefficients is smaller than the set of frequency coefficients; and, generates compressed image data using the encoded frequency coefficients.

In one embodiment the apparatus includes: an encoder input buffer that receives the image data; and, an encoder output buffer that stores compressed image data.

In one embodiment the apparatus includes an encoder input buffer that: buffers image data corresponding to a next n-1 rows of pixels of the image; buffers image data for a next n pixels of the next row of pixels, allowing the at least one encoder processing device to obtain pixel data for a next n×n block of pixels from the buffered image data; repeats step b) until pixel data has been obtained from all of the n rows of pixels; and, repeats steps a) and b) until pixel data has been obtained from each row of pixels of the image.

In one embodiment the apparatus includes an encoder transmitter that transmits the image data from the encoder output buffer.

In one embodiment the at least one encoder processing device includes: a field programmable gate array; an Application-Specific Integrated Circuit and a Graphics Processing Unit.

In one embodiment the pixel data defines a plurality of channels, and wherein the apparatus includes at least one of a respective processing device for each channel and a parallel processing device for processing each channel in parallel.

In one embodiment the pixel data defines RGB channels, and wherein the apparatus: converts the RGB channels into YCbCr channels; and, uses processing devices to selectively encode the YCbCr channels.

In one embodiment the pixel data defines RGB channels, and wherein the apparatus: uses an YCbCr processing device to convert the RGB channels to CbCr channels; uses at least one processing device to decode the CbCr channels; and, uses a delay block to transfer the Y channel from the YCbCr processing device to an output buffer.

In one embodiment the apparatus includes an encoder in wireless communication with a decoder allowing image data to be transferred between the encoder and decoder as compressed image data.

In one embodiment the encoder is at least one of coupled to and part of a suitably programmed processing system.

In one embodiment the decoder is at least one of coupled to and part of a wearable display device.

In one embodiment the encoder and decoder communicate to exchange at least one of: compressed image data; movement data indicative of movement of a display device; control data that is used at least in part to control the display device; input data indicative of user input commands; gaze data indicative of a point of gaze of an observer; and, sensor data from sensors associated with a wearable display device.

In one broad form an aspect of the present invention seeks to provide a method of decompressing compressed image data representing one or more images, the method including: obtaining compressed image data; determining a set of encoded frequency coefficients from the compressed image data in accordance with a bit encoding scheme that defines the number of bits used in each encoded frequency coefficient; performing bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients; and, applying an inverse transformation to the set of frequency coefficients to determine pixel data representing an array of pixels within the one or more images.

In one embodiment the method includes: selecting one of a plurality of decoding schemes; and, decoding the pixel data using the selected decoding scheme.

In one embodiment the method includes selecting the decoding scheme at least in part depending on at least one of: selection rules; a desired degree of compression; a position of the array of pixels; and, an encoding code indicative of the encoding scheme used, the encoding code being determined from the compressed image data.

In one embodiment the bit encoding scheme uses a smaller number of bits to encode frequency coefficients corresponding to higher frequencies and wherein the method includes generating at least some of the frequency coefficients corresponding to higher frequencies.

In one embodiment the method includes applying a scaling factor to at least some of the frequency coefficients so that scaled frequency coefficients are transformed and wherein at least one of: different scaling factors are applied to at least some encoded frequency coefficients; the same scaling factor is applied to each encoded frequency coefficient; and, the scaling factor is used to increase a magnitude of each encoded frequency coefficient.

In one embodiment the method includes: selecting one of a plurality of bit encoding schemes; and, decoding the encoded frequency coefficients in accordance with the selected bit encoding scheme.

In one embodiment each of the plurality of bit encoding schemes selectively encodes different frequency coefficients with respective different numbers of bits to provide a different degree of compression.

In one embodiment the bit encoding scheme is selected at least in part depending on at least one of: an encoding code; selection rules; the bit encoding scheme used to generate the compressed image data; and, the position of the array of pixels.

In one embodiment the selection rules depend on at least one of: a transmission bandwidth of a communications link used to transmit the compressed image data; a transmission quality of service of a communications link used to transmit the compressed image data; movement of a display device; image display requirements; a target display resolution; a channel being processed; a position of the array of pixels within the one or more images; and, a position of the array of pixels within the one or more images relative to a point of gaze of an observer of the one or more images; and, error metrics.

In one embodiment the method includes: determining a point of gaze of an observer of the one or more images; selectively decoding encoded frequency coefficients at least partially in accordance with the point of gaze.

In one embodiment the method includes: determining a distance between the point of gaze and a position of the array of pixels in the one or more images; and, selectively decoding the encoded frequency coefficients in accordance with the distance so that more frequency coefficients are generated for greater distances.

In one embodiment the frequency components are arranged in a plurality of levels and wherein each bit encoding scheme defines a respective number of bits to be used to encode the frequency coefficients in each of the plurality of levels.

In one embodiment the array is an N×N array of pixels resulting in 2N-1 levels of frequency components.

In one embodiment the image data defines a plurality of channels, and wherein the method includes selectively decoding encoded frequency coefficients for each channel.

In one embodiment the compressed image data defines YCbCr channels, and wherein the method includes: performing an inverse transform of the YCbCr channels; and, converting the transformed YCbCr channels into RGB channels.

In one embodiment the method includes at least one of: generating more frequency coefficients for the Cb or Cr channels than the Y channel; decoding the encoded YCbCr channels in parallel. decoding the CbCr channels and converting the decoded CbCr channels and the Y channel into RGB channels.

In one embodiment the inverse transformation is an inverse 2-D discrete cosine transformation.

In one embodiment the method includes using the pixel data to generate a video feed.

In one embodiment the method includes: decoding compressed image data at least in part by serial to parallel byte decoding; and, selectively decoding frequency coefficients in parallel.

In one embodiment the digital reality is at least one of: augmented reality; virtual reality; and, mixed reality.

In one embodiment the method is used for displaying image data in a wearable digital reality headset by receiving the compressed image data from a computing device via at least one of: a communication network; and, a wireless communications link.

In one embodiment the method is used for at least one of: transmitting virtual reality video data; and, wirelessly transmitting virtual reality video data.

In one broad form an aspect of the present invention seeks to provide apparatus for decompressing compressed image data representing one or more images, the apparatus including at least one electronic decoder processing device that: obtains compressed image data; determines a set of encoded frequency coefficients from the compressed image data in accordance with a bit encoding scheme that defines the number of bits used in each encoded frequency coefficient; performs bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients; and, applies an inverse transformation to the set of frequency coefficients to determine pixel data representing an array of pixels within the one or more images.

In one embodiment the apparatus includes: a decoder input buffer that receives the compressed image data; and, a decoder output buffer that stores the image data.

In one embodiment the apparatus includes a decoder transceiver that receives the compressed image data and provides the compressed image data to the input buffer.

In one embodiment the at least one decoder processing device includes a field programmable gate array; an Application-Specific Integrated Circuit and a Graphics Processing Unit.

In one embodiment the compressed image data defines a plurality of channels, and wherein the apparatus includes at least one of a respective processing device for each of the channels and a parallel processing device for processing each channel in parallel.

In one embodiment the compressed image data defines YCbCr channels, and wherein the apparatus: uses at least one processing device to decode the CbCr channels; and, converts the decoded YCbCr channels into RGB channels.

In one embodiment the compressed image data defines YCbCr channels, and wherein the apparatus: uses processing devices to decode the CbCr channels; uses an RGB processing device to convert the decoded CbCr channels and the Y channel into RGB channels; and, uses a delay block to transfer the Y channel from a decoder input buffer to the RGB processing device.

In one embodiment the apparatus includes a decoder in wireless communication with an encoder allowing image data to be transferred between the encoder and decoder as compressed image data.

In one embodiment the decoder is at least one of coupled to and part of a suitably programmed computer system.

In one embodiment the decoder is at least one of coupled to and part of a wearable display device.

In one embodiment the decoder and encoder communicate to exchange at least one of: compressed image data; movement data indicative of movement of a display device; control data that is used at least in part to control the display device; input data indicative of user input commands; gaze data indicative of a point of gaze of an observer; and, sensor data from sensors associated with a wearable display device.

In one broad form an aspect of the present invention seeks to provide a method of compressing image data representing one or more images, the method including: obtaining pixel data from the image data, the pixel data representing an array of pixels within the one or more images; determining an encoding scheme; encoding the pixel data using the encoding scheme; determining an encoding code indicative of the encoding scheme used; and, generating compressed image data using the encoding code and encoded pixel data.

In one embodiment the method includes, determining the encoding scheme at least one of: based on an image type of the image data; based on an encoding scheme indication received from an image data source; by analysing at least one of the image data and the pixel data; and, based on compression requirements including at least one of: a compression amount; a resulting image quality; and, a compression latency.

In one embodiment the method includes analysing the pixel data to determine if the array of pixels is at least one of: a gradient; a boundary; and, a single colour.

In one embodiment the method includes at least one of: if the array of pixels is a solid colour, substituting the array of pixels for a encoding code indicative of the solid colour; if the array of pixels is a gradient, the method includes using a method according to another aspect of the invention to encode the pixel data; and, using a method according to another aspect of the invention to encode the pixel data.

In one broad form an aspect of the present invention seeks to provide apparatus for compressing image data representing one or more images, the apparatus including at least one electronic encoder processing device that: obtains pixel data from the image data, the pixel data representing an array of pixels within the one or more images; determines an encoding scheme; encodes the pixel data using the encoding scheme; determines a encoding code indicative of the encoding scheme used; and, generates compressed image data using the encoded frequency coefficients.

In one broad form an aspect of the present invention seeks to provide a method of decompressing compressed image data representing one or more images, the method including: obtaining compressed image data; determining an encoding code from the compressed image data; determining an encoding scheme using the encoding code; and, decoding at least part of the compressed image data using the encoding scheme to determine pixel data representing an array of pixels within the one or more images.

In one embodiment the method includes at least one of: substituting an encoding code for an array of pixels of a solid colour; using a method according to another aspect of the invention to decode compressed image data for an array of pixels for a gradient; and, using a method according to another aspect of the invention to decode the compressed image data.

In one broad form an aspect of the present invention seeks to provide apparatus for decompressing compressed image data representing one or more images, the apparatus including at least one electronic decoder processing device that: obtains compressed image data; determines an encoding code from the compressed image data; determines an encoding scheme using the encoding code; and, decodes at least part of the compressed image data using the encoding scheme to determine pixel data representing an array of pixels within the one or more images.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1:
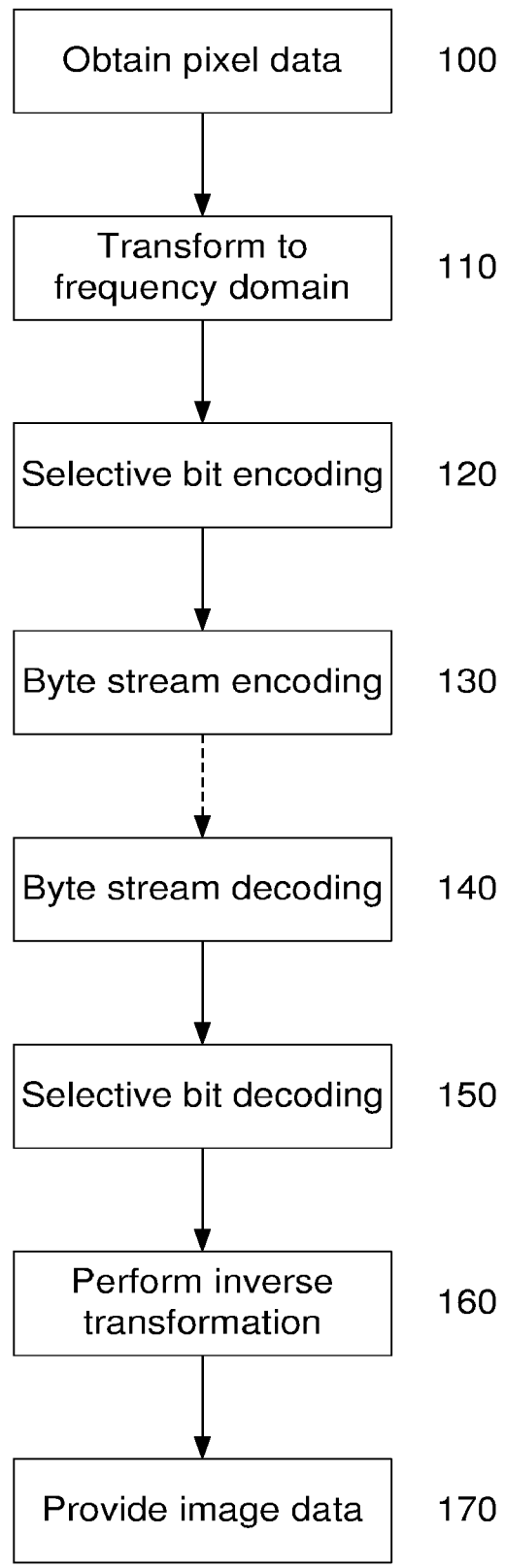
FIG. 1 is a flow chart of an example of a method for compressing and subsequently decompressing image data.

An example of a method for compressing and subsequently decompressing image data will now be described with reference to FIG. 1.

For the purpose of illustration, it is assumed that the process is performed at least in part using one or more electronic processing devices. In one example, respective processing devices are used for compressing and decompressing the image data, allowing compressed image data to be transferred between the two processing devices, although this is not essential and alternatively the same processing device can be used for compressing and decompressing the image data.

The processing devices could form part of respective processing systems, such as computer systems, computer servers, client devices, including mobile phones, portable computers, display devices, such as wearable or head mounted displays, or alternatively could be in the form of independent modules, coupled to such devices.

The image data typically represents one or more images, and in one example, represents a sequence of images to be displayed on a respective display device. As will be apparent from the following description, in one particular example, the image data is a sequence of images adapted to be displayed remotely to a source, such as in virtual or augmented reality graphics application in which images are displayed on a wearable display, and/or in telepresence applications, in which images are displayed from a remote controllable system, such as a drone mounted camera, or the like.

In this example, at step 100 pixel data is obtained from image data, with the pixel data representing an array of pixels within the one or more images. The pixel data can be obtained in any appropriate manner, depending on the format of the image data. In one example, this is achieved simply by selecting a particular sequence of bytes from within the image data. The array of pixels typically corresponds to a set number of pixels, such as an 8×8 block of pixels from within one of the images, although other arrays of pixels could be used.

At step 110, a transformation is applied to the pixel data to determine a set of frequency coefficients indicative of frequency components of the array of pixels. The transformation is therefore typically a frequency transformation, such as a Fourier transform, or the like and in one example is a 2D DCT (Discrete Cosine Transform). The transformation could be applied in any suitable manner, for example using known transformation techniques, but in one example is performed in a highly parallel manner, thereby reducing the processing time.

At step 120, at least some of the frequency coefficients are selectively encoded using a bit encoding scheme to thereby generate a set of encoded frequency coefficients. The bit encoding scheme defines the number of bits used to encode each frequency coefficient, with the frequency coefficients being selectively encoded so that at least some of the encoded frequency coefficients have different numbers of bits and at least one frequency coefficient is discarded so that the set of encoded frequency coefficients is smaller than the set of frequency coefficients.

This process could be achieved in any suitable manner, and could include discarding some of the frequency coefficients, and then encoding the remaining frequency coefficients with different numbers of bits, to thereby minimise the number of bits required to encode the frequency coefficients. Alternatively, the process could include encoding some of the frequency coefficients with zero bits, thereby effectively discarding the respective frequency coefficients as part of the encoding step.

The particular frequency components that are discarded will vary depending on the preferred implementation. Typically the higher frequency components are discarded as their magnitude is smaller and as these correspond to sharp transitions within images, meaning their contribution to the overall image quality is less. This allows higher frequency component coefficients to be discarded without adversely effecting perceived image quality in a noticeable manner. In addition to discarding frequency components corresponding to higher frequencies, the process can encode frequency coefficients for higher frequency components with less bits, thereby reducing the overall number of bits required to encode the frequency coefficients.

Similarly, when encoding the frequency coefficients with different numbers of bits, this is performed independently of the actual value of the frequency coefficient and is instead performed based on an understanding of the expected magnitude of the frequency coefficient. For example, frequency coefficients at lower frequencies are generally larger in magnitude, and hence are typically encoded with a larger number of bits, whereas frequency coefficients at higher frequencies are typically smaller in magnitude and hence can be encoded with fewer bits. This enables the values of the frequency coefficients to be encoded without loss of information.

Once encoding has been performed, compressed image data can be generated at step 130, using the encoded frequency coefficients. For example, this can be performed by creating a byte stream including sequences of the encoded frequency coefficients, optionally with additional information, so as flags or other markers, to identify the start of a new image, or the like.

Accordingly, the above described process allows compressed image data to be created by selectively encoding frequency coefficients using a bit encoding scheme that discards at least some of the frequency coefficients and encodes the remaining coefficients using different numbers of bits, for example depending on the magnitude of the frequency coefficient. Thus, smaller magnitude coefficients can be encoded using a smaller number of bits without any loss in information.

It should be noted that this approach should be contrasted to a code substitution technique, such as Huffman encoding, in which values are substituted for shorter codes. Instead, in this example the values are still encoded, albeit using a number of bits appropriate to the expected magnitude of the value, so if it expected that the value of the frequency coefficient would not exceed seven, then this could be encoded as a three bit word, so six would be encoded as "110", as opposed to using a default eight bit word "00000110". In contrast, if it is expected that the value of the frequency coefficient is up to sixty three, a six bit word could be used, so for example, twenty could be encoded "010100". In the event that the value exceeds the available number of bits, then the maximum value available for the define number of bits could be used, in turn resulting in a loss of accuracy in the resulting compressed image data.

Thus, the bit encoding scheme uses information regarding the expected size of the frequency coefficient values in order to define the number of bits that should be used. A less aggressive bit encoding scheme will use a greater number of bits, resulting in reduced compression, but with a greater resolution, whereas a more aggressive bit encoding scheme will use few bits, and hence provide greater compression, but with a trade off in reduced resolution.

In any event, by using a bit encoding scheme that defines the number of bits used to encode each frequency coefficient, this allows the same scheme to be used in decompressing the compressed image data, in turn allowing accurate decompression to be performed, whilst allowing the bit encoding scheme used to be configured to optimise the compression for the current situation.

In this regard, at step 140 a set of encoded frequency coefficients are determined from the compressed image data in accordance with the bit encoding scheme. In particular, information regarding the number of bits used to encode each frequency coefficient allows the received compressed image data to be segmented into the encoded frequency coefficients by selecting the next number of bits that makes up the next frequency coefficient.

At step 150, selective bit decoding of the encoded frequency coefficients is performed in accordance with the bit encoding scheme, to thereby generate a set of frequency coefficients. In this regard, this is performed to convert each encoded frequency coefficient into a frequency coefficient and additionally to generate frequency coefficients that were discarded during the encoding process. In particular this is typically performed to generate frequency coefficients with null values to thereby recreate a full set of frequency coefficients.

Following this an inverse transformation can be applied to the set of frequency coefficients to determine pixel data representing an array of pixels within the one or more images. In particular, this is typically in the form of an inverse frequency transformation, such as an inverse Fourier transform, 2D DCT, or the like.

Accordingly, the above described process allows image data to be encoded by selectively encoding frequency coefficients using a bit encoding scheme and then subsequently using the same bit encoding scheme to decode the encoded frequency coefficients. Furthermore, the bit encoding scheme used can be adaptive and can depend on a wide range of criteria, such as the nature of the image data being encoded, the particular channel being encoded, or the like. This allows the bit encoding scheme to be applied to thereby maximise the amount of compression that can be achieved.

In addition to the above described advantages, the scheme can be implemented in a highly parallel manner, for example, allowing each of the frequency coefficients to be encoded in parallel. This in turn enables the process to be performed rapidly, thereby reducing latency, which is important in many applications, such as virtual reality applications, in which images are created in response to movement of a display device and must be transmitted rapidly to the display device for display.

A number of further features will now be described.

In one example, the bit encoding scheme uses a smaller number of bits to encode frequency coefficients corresponding to higher frequencies. This is due to the higher frequency components having a smaller magnitude, meaning that a lower number of bits are required to accurately encode the frequency coefficients for higher as opposed to lower frequencies. In one example, a progressively smaller number of bits are used to encode frequency coefficients corresponding to progressively higher frequencies. In this case, frequency coefficients at successively higher frequencies would have a number of bits equal to or less that a frequency coefficient of a preceding lower frequency. Similarly, the method can include discarding at least some of the frequency coefficients corresponding to higher frequencies as these tend to have less impact on perceived image quality. It will also be appreciated that for some of the lower frequency coefficients, all of the bits required to encode the coefficient may be retained, which in some examples could be more than 8 bits.

In one example, the method includes applying a scaling factor to at least some of the frequency coefficients so that scaled frequency coefficients are encoded. In this regard, scaling is used to reduce the magnitude of the frequency coefficients, so that these can be encoded using a smaller number of bits. A similar scaling factor can be applied when decompression is performed, thereby scaling the respective frequency components back to their original magnitude. During this process, rounding is typically performed so that the scaled frequency component is an integer value, or has a limited number of significant figures, thereby minimising the number of bits used to encode the coefficients. It will be appreciated that when this is performed, there is a resulting reduction in accuracy of the recreated frequency components, but that the effect of this on the resulting image quality is negligible.

In one example, the same scaling factor is applied to each frequency coefficient. This is particularly advantageous as this reduces the computational burden in performing the scaling. In particular, this allows a single scaling factor to be read from memory, such as a register, or allowing this be hard coded within logic configurations, thereby making the process of scaling the frequency coefficients more rapid. However, this is not essential, and different scaling factors can be applied to different frequency coefficients, for example to scale frequency coefficients for higher frequencies by a greater amount.

In one example, the method includes applying a scaling factor to the frequency components to determine scaled frequency components, selecting one or more scaled frequency components in accordance with selection criteria and generating compressed image data by performing bit encoding of the selected scaled frequency components in accordance with a bit encoding scheme to thereby limit the number of bits used to encode each selected scaled frequency component. However, this is not essential and other approaches could be used, such as performing scaling after discarding some of the frequency coefficients, or the like.

In one example, the method can includes selecting one of a plurality of encoding schemes and encoding the pixel data using the selected encoding scheme. This allows different encoding schemes to be selected based on factors, such as a required degree of compression. Thus, each of the encoding schemes could provide a respective degree of compression, for example by using different compression approaches, or using the above described approach with one of a plurality of different bit encoding schemes. In this latter case, each of the plurality of bit encoding schemes selectively encodes different frequency coefficients with respective different numbers of bits, to provide a different degree of compression.

The particular encoding scheme used can be selected based on a range of factors, such as selection rules, a desired degree of compression and/or a position of the array of pixels in the one or more images, which can in turn be used to provide foveated compression, as will be described in more detail below.

Similarly, in one example, the method typically includes selectively encoding frequency coefficients in accordance with selection rules, a desired degree of compression and/or a position of the array of pixels in the one or more images. In this regard, the selection rules can be used to define which frequency coefficients are encoded, and/or the particular bit encoding scheme used, which in effect achieve the same end result and should therefore be considered as equivalent processes.

For example, the selection rules can be used to select a subset of the frequency coefficients for encoding, with these then being encoded using the bit encoding scheme. Alternatively, a bit encoding scheme can be selected in accordance with selection rules, with the bit encoding scheme encodes at least some of the frequency coefficients with zero bits, and then encoding the frequency coefficients in accordance with the bit encoding scheme.

In either case, the use of selection rules allows the selective bit encoding to be performed dynamically, so that the frequency coefficients selected and/or the number of bits used to encode the selected frequency coefficients can be adjusted depending on the circumstances. Similar selection rules can be used when decompressing the compressed image data, thereby allowing the bit encoding scheme and/or discarding of frequency coefficients to be performed dynamically depending on the particular circumstances, whilst ensuring the compressed data can be accurately decompressed.

In one example, this allows a number of different factors to be taken into account, such as a transmission bandwidth of a communications link used to transmit the compressed image data, a transmission quality of service of a communications link used to transmit the compressed image data, movement of a display device, image display requirements, a target display resolution, an image channel being processed, a position of the array of pixels within the one or more images or a position of the array of pixels within the one or more images relative to a point of gaze of an observer of the one or more images. As a further alternative, error metrics indicative of errors in the decompressed images and/or transmission of data can be used in order to control the degree of compression used. It will be appreciated that these arrangements can be used to adjust the degree of compression dynamically, for example by changing the bit encoding scheme used to compress the image data. For example, if compression artefacts exceed a threshold compression can be reduced, whilst if available transmission bandwidth falls, compression can be increased. This ability to dynamically adjust the compression helps optimise the compression to obtain the best possible image quality for the current circumstances.

For example, the relative quality of some parts of an image may not be as important as other parts. In the case of virtual reality, peripheral parts of an image are often not actually displayed to a user due to image distortion of the display lenses. Consequently, such parts of the image could be encoded with an effective zero quality, thereby vastly reducing the amount of compressed image data without any loss in image quality of the viewable image.

In another example, particularly in a virtual reality application, this can be performed on the basis of a point of gaze of an observer. In this example, this involves determining a point of gaze of an observer of the one or more images and selectively encoding frequency coefficients at least partially in accordance with the point of gaze. Specifically, this can involve determining a distance between the point of gaze and a position of the array of pixels in the one or more images and selectively encoding frequency coefficients in accordance with the distance so that less frequency coefficients are encoded for greater distances. Thus, analysis can be performed of which part of an image an observer is viewing, for example using eye tracking technologies or similar, and then encoding parts of the image nearer the point of gaze with a higher quality. In this regard, an observer's perception in peripheral regions will typically be reduced, so that a reduction in image quality is typically less noticeable. Consequently, by encoding the image with a higher quality nearer the observer's point of gaze, this allows an image with an overall lesser quality to be perceived by the observer as having an equivalent quality.

In one example, the frequency components are arranged in a plurality of levels, with each bit encoding scheme defining a respective number of bits to be used to encode the frequency coefficients in each of the plurality of levels. Similarly, or with selection rules defining from which levels frequency coefficients should be encoded. Thus, the bit encoding scheme and/or selection of frequency coefficients can be defined in terms of respective levels, as will be apparent from the following description.

In one example, the array of pixels is an N×N array of pixels resulting in 2N-1 levels of frequency components, although it will be appreciated that this will depend on the particular implementation.

In one example, in addition to performing the above described lossy compression, an additional lossless compression step can be performed. This typically involves parsing a sequence of bytes, identifying a sub-sequence including a number of identical bytes and substituting the sub-sequence for a code indicative of a value of the identical bytes and a number of identical bytes in the sub-sequence. In one example, when sub-sequence of identical bytes includes three or more bytes, the code includes two bytes, although it will be appreciated that other suitable coding schemes could be used.

Whilst such code substitution, often referred to as run length encoding, could be performed on any sequence of bytes, in one example, the sequence of bytes is the bit stream formed from the encoded frequency coefficients. In this regard, it is typical for many of the encoded frequency coefficients to have a zero value, meaning that when the bit stream formed from the encoded frequency coefficients is analysed as a sequence of bytes, it is frequent for there to be multiple zero value bytes in sequence. Accordingly, by substituting these for a code, this allows the number of bytes to be reduced.

In one example, the image data defines a plurality of channels, with the method including selectively encoding frequency coefficients for each channel. By encoding different channels individually, this allows different channels to be encoded differently, for example using different bit encoding schemes, or discarding different frequency coefficients. Additionally, encoding channels independently allows channels to be encoded in parallel, which can significantly assist in reducing the time taken to perform encoding and hence reduce encoding latency.

In one example, the pixel data defines RGB channels, and the method includes converting the RGB channels into luminance and chrominance channels YCbCr and transforming the YCbCr channels. In this regard, luminance and chrominance channels are perceived differently by the human eye, allowing chrominance channels to be encoded using a greater degree of compression and hence a reduce quality compared to the luminance channel, without a resulting loss in perceived quality. However, it will be appreciated that this is not essential and processing could alternatively be performed in the RGB channels, in which case colour conversion is not necessarily required.

Thus, in this example, the method can include selectively encoding more frequency coefficients for the Y channel than the Cb or Cr channels, and similarly can include selectively encoding frequency coefficients for the Y channel with more bits than for the Cb and Cr channels.

In a further example, where the pixel data defines RGB channels, the method can includes converting the RGB channels into YCbCr channels and generating the compressed image data by encoding the CbCr channels and using the Y channel. This, in effect in this example, the Y channel is effectively unencoded, meaning the entire information contained within the luminance channel is retained. This can be particularly useful in some encoding scenarios, for example when encoding pixel arrays showing a gradient, as this can help preserve the colour variations and hence improve image quality, whilst resulting in only a minor decrease in compression.

As mentioned above, the different channels can be encoded in parallel. Additionally, the frequency coefficients with each channel can be encoded in parallel. In this case, the method of generating compressed image data typically includes performing parallel to serial byte encoding, so that the frequency coefficients are serialised into a byte stream, which can then undergo byte encoding.

In one example, the method of obtaining pixel data from image data includes buffering image data corresponding to a next n-1 rows of pixels of the image, buffering image data for a next n pixels of the next row of pixels and obtaining pixel data for a next n×n block of pixels from the buffered image data. This is repeated until pixel data has been obtained from all of the n rows of pixels, at which point this is repeated, for a next n rows by buffering image data corresponding to a next n-1 rows of pixels of the image, buffering image data for a next n pixels of the next row of pixels and obtaining pixel data for a next n×n block of pixels from the buffered image data.

Thus, it will be appreciated from this that the process does not require that an entire image is buffered, but rather only requires that n-1 rows of pixels and a further n pixels from the next row are buffered before processing starts. This has two major impacts, namely reduces processing times, in turn leading to significant reductions in latency, as well as reducing overall memory requirements. The value of n is generally an integer and can be set depending on factors, such as selection rules, a required degree of compression, a position of the array of pixels or the like. In one example n=8, but this is not essential, and any value could be used.

Whilst the image data can be obtained from any source, in one example, the method includes obtaining the pixel data from a video feed, such as a sequence of images for display. In one example, the method is used for transmitting virtual reality video data and in one particular example for wirelessly transmitting virtual reality video data.

The above described process can also be used for providing images forming part of any digital reality content, including augmented reality, virtual reality, mixed reality, telepresence or the like.

In one example, the method can be used for displaying image data in a wearable digital reality headset by receiving the compressed image data from a computing device via at least one of a communication network and a wireless communications link. This could include transferring compressed images wirelessly from a computer or other similar device, or could include transferring compressed images from a cloud based computing environment to a local device, such a headset mounted smart phone, allowing creation of images to be performed using cloud computing. Examples of suitable connections, include a hardwired gigabit internet, streaming to mobile phones, for example via mobile communications networks, such as 3G, 4G or 5G networks, transmitting via a wired connection to a tethered HMD, or via a wireless connection to an untethered HMD, or the like.

It will be appreciated that similar approaches can be used when decompressing the compressed image data.

For example, the same bit encoding scheme can be used, so that the bit encoding scheme uses a smaller number of bits to encode frequency coefficients corresponding to higher frequencies. In this case, as at least some of the frequency coefficients corresponding to higher frequencies are discarded during compression, these must be regenerated during decompression, typically as null values, allowing a subsequent inverse transform to be applied, as will be described in more detail below.

Typically the method includes applying a scaling factor to at least some of the frequency coefficients so that scaled frequency coefficients are transformed. Again, the same scaling factor is applied to each frequency coefficient to thereby increase a magnitude of each frequency coefficient, thereby reversing the scaling performed during compression and regenerating an approximation of the original frequency coefficient magnitudes.

The method can include selecting one of a plurality of decoding schemes and decoding the pixel data using the selected decoding scheme. In this case, the decoding scheme can be selected using selection rules, a desired degree of compression or a position of the array of pixels, in a manner similar to the selection of the encoding scheme as described above with respect to image compression. Alternatively, this can be performed based on an encoding code indicative of the encoding scheme used, the encoding code being determined from the compressed image data.

Again, the decoding scheme could be different to that outlined above, but could be the same using one of a plurality of different bit encoding schemes, decoding the encoded frequency coefficients in accordance with the selected bit encoding scheme. In this case, each of the plurality of bit encoding schemes selectively encodes different frequency coefficients with respective different numbers of bits to provide a different degree of compression.

Similarly, and effectively equivalently, the method can include selectively decoding the encoded frequency coefficients in accordance with selection rules, in particular by generating encoded frequency coefficients in accordance with selection rules and decoding the encoded frequency coefficients in accordance with the bit encoding scheme.

As during compression, the selection rules typically depend on a range of factors, such as one or more of a transmission bandwidth of a communications link used to transmit the compressed image data, a transmission quality of service of a communications link used to transmit the compressed image data, movement of a display device, image display requirements, a target display resolution, a channel being processed, a position of the array of pixels within the one or more images or a position of the array of pixels within the one or more images relative to a point of gaze of an observer of the one or more images.

For example, this can involve determining a point of gaze of an observer of the one or more images and selectively decoding encoded frequency coefficients at least partially in accordance with the point of gaze. This is typically achieved by determining a distance between the point of gaze and a position of the array of pixels in the one or more images and selectively decoding the encoded frequency coefficients in accordance with the distance so that more frequency coefficients are generated for greater distances. However, it will be appreciated that the implementation of selection rules could be achieved in any suitable manner depending on the preferred implementation.

The frequency components are typically arranged in a plurality of levels, with the bit encoding scheme defining a respective number of bits to be used to encode the frequency coefficients corresponding to frequency components within respective ones of the plurality of levels or the selection rules defining from which levels frequency coefficients should be generated.

In the event that lossless encoding is also performed, the method typically includes identifying a code within a sequence of bytes and substituting the code for a sub-sequence including a number of identical bytes. In this case, the code is typically indicative of a value of the identical bytes and a number of identical bytes in the sub-sequence. Again, the sub-sequence typically includes three or more bytes and the code includes two bytes, although other suitable arrangements could be used. Typically this process is performed on the compressed image data, with this being used to generate the bit stream, which is then used in creating the encoded frequency coefficients.

As previously described the image data typically defines a plurality of channels, with encoded frequency coefficients being selectively decoded for each channel independently. The channels typically include YCbCr channels, with the method including performing an inverse transform of the YCbCr channels and converting the transformed YCbCr channels into RGB channels. Typically, the inverse transformation is an inverse 2-D discrete cosine transformation, although other suitable transforms could be used. It will also be appreciated that if the Y channel has not been encoded, as described above, the method can include decoding the CbCr channels and then converting the decoded CbCr channels and the Y channel into RGB channels.

As in the example of compressing the image data, the method typically includes generating more frequency coefficients for the Cb or Cr channels than the Y channel. The method can also include decoding the encoded YCbCr channels in parallel, as well as selectively bit decoding individual frequency components in parallel, in which case compressed image data can be at least partially decoded by serial to parallel byte decoding, effectively segmenting the incoming byte stream into individual bit encoded frequency components, which are then decoded in parallel.

The decompressed data may also undergo further processing, such as using a deblocking filter, which is used for smoothing the sharp edges which can form between macroblocks when block coding techniques or the like used. This in turn can allow an increased degree of compression to be used, whilst avoiding a corresponding reduction in image quality.

In a further example, the above described method is performed by a respective hardware configuration. For example, compressing image data can be performed by an encoder including an electronic encoder processing device that obtains pixel data from the image data, performs a frequency transformation, selectively encodes at least some of the frequency coefficients using a bit encoding scheme and generates compressed image data using the encoded frequency coefficients.

Similarly decompressing the compressed image data can be performed using a decoder including an electronic decoder processing device that obtains compressed image data, determines a set of encoded frequency coefficients from the compressed image data, performs bit decoding of the encoded frequency coefficients in accordance with the bit encoding scheme and applies an inverse transformation to the set of frequency coefficients to determine pixel data representing an array of pixels within the one or more images.

Figure 2A:
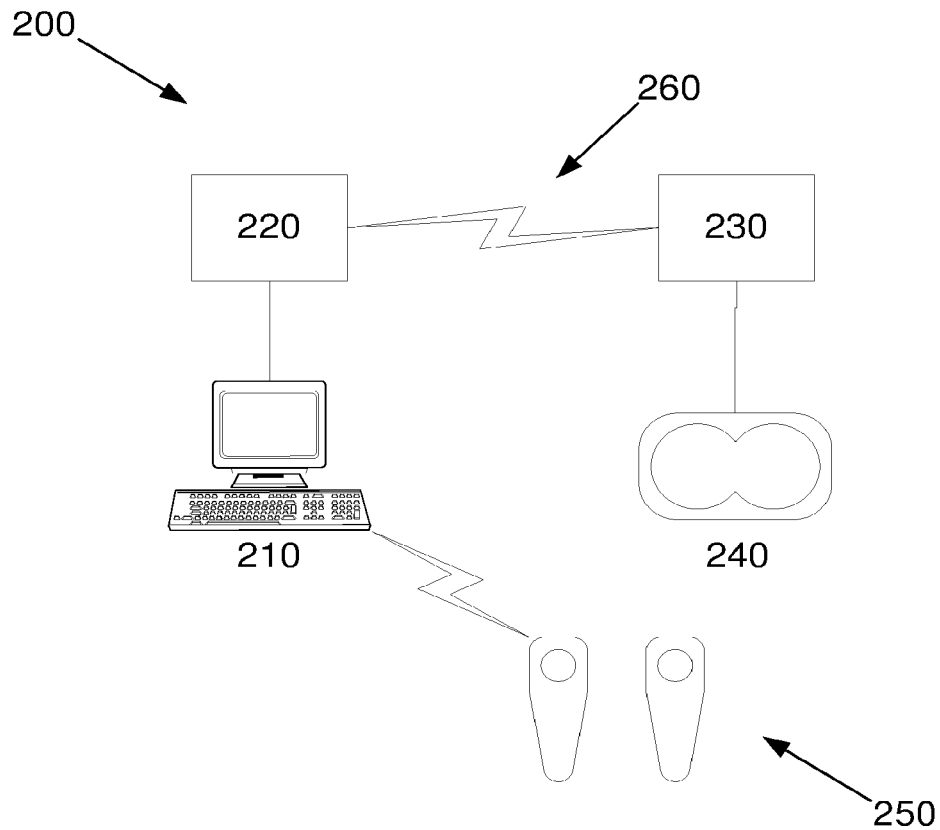
FIG. 2A is a schematic diagram of a first example of an apparatus for displaying images on a wearable device.

In one example, the apparatus includes an encoder and decoder in wireless communication, allowing image data to be transferred between the encoder and decoder as compressed image data. In one particular example, this can be utilised in order to provide wireless communication between a wearable display device, such as an HMD and a processing system. An example of this will now be described with reference to FIG. 2A.

In this example, a processing system 210, such as a suitably programmed computer system, gaming console, or the like, is adapted to generate content for display on an HMD 240. The processing system 210 typically achieves this by receiving sensor data from the HMD regarding the pose of the HMD, and optionally input data from one or more separate controller 250. The processing system 210 then generates content based on the sensor and/or input data, typically in the form of video data, which can be output from a video card or the like. The video data is transferred to an encoder 220, which encodes the video data by compressing the image data, before wirelessly transferring the compressed image data to the decoder 230, via a wireless communications link 260. The decoder 230 decodes the compressed image data, and provides the resulting video data to the HMD for display.

It will be appreciated that this arrangement allows for existing computer systems, gaming consoles or the like and HMDs 210, 240, to be connected via a wireless connection 260, thereby obviating the need for a wired connection between the processing system 210 and HMD 240. Thus, for example, a user could wear an HMD and associated decoder, and then connect the encoder to their computer system or gaming console, allowing a wireless HMD arrangement to be provided. This can be used to convert traditional tethered headsets into a wireless arrangement.

Figure 2B:
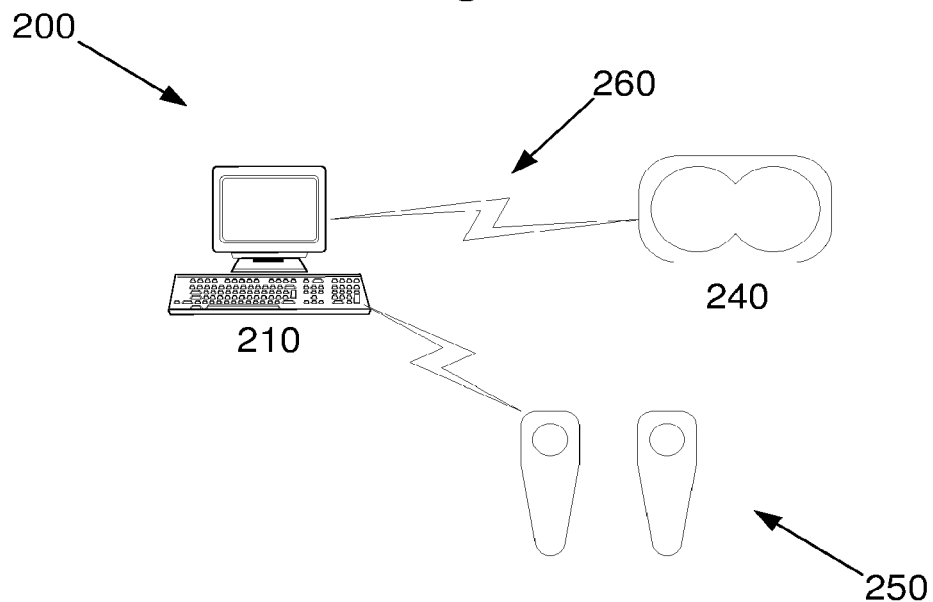
FIG. 2B is a schematic diagram of a second example of an apparatus for displaying images on a wearable device.

However, this is not essential, and alternatively, the processing system 210 and HMD 240 can be configured to include integrated encoder and decoder hardware, allowing these to communicate via a direct wireless connection 260, as shown in FIG. 2B. For example, the encoder could be provided in a computer system used for generating content, whilst the decoder could be integrated in a smart phone, for example in a Snapdragon 820 Hexagon DSP or similar, allowing the smart phone to receive and decode content streamed wirelessly from the computer system. In one example, this allows the computer system to stream over a local wireless connection, but in another example this could be used to provide content via a mobile phone network or similar from a cloud based digital reality engine.

Figure 3:
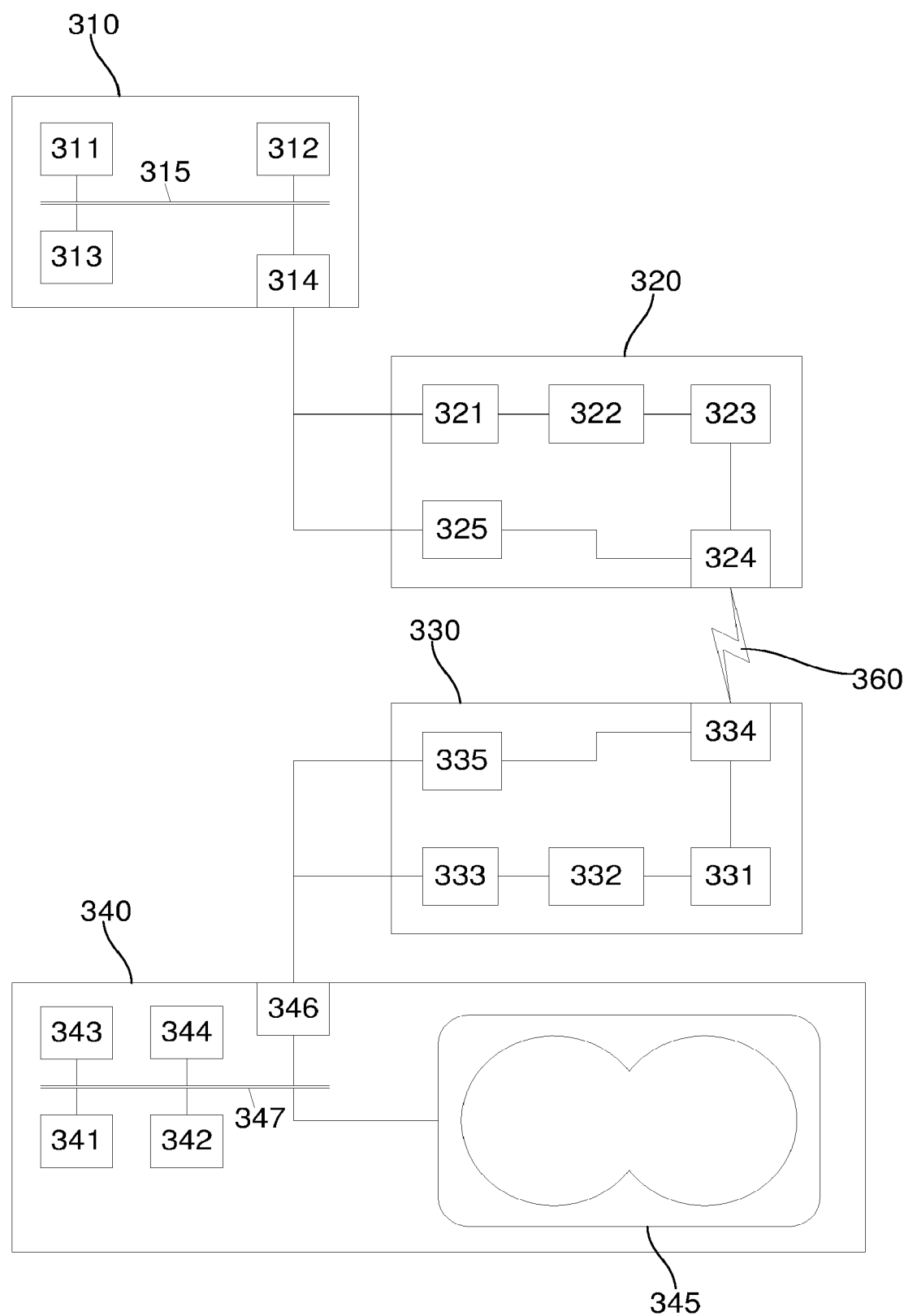
FIG. 3 is a schematic diagram of a specific example of a virtual reality system incorporating apparatus for compressing and decompressing image data.
Figure 4A:
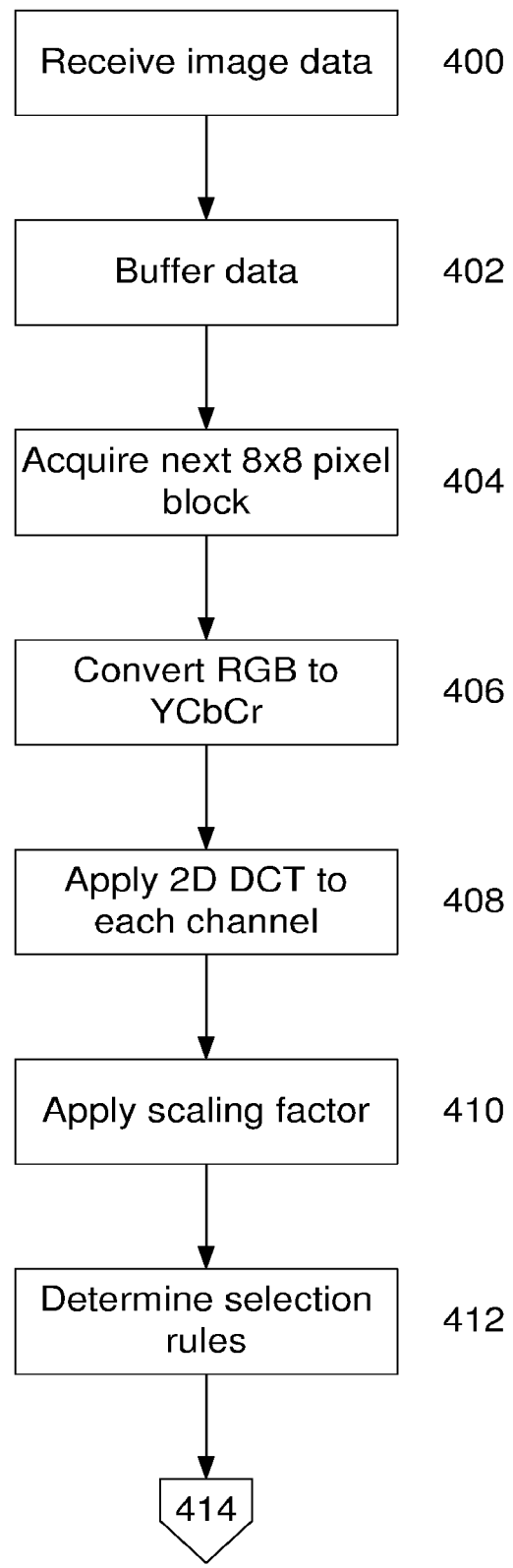
FIGS. 4A to 4D are a flow chart of a specific example of a method for compressing and subsequently decompressing image data.
Figure 4B:
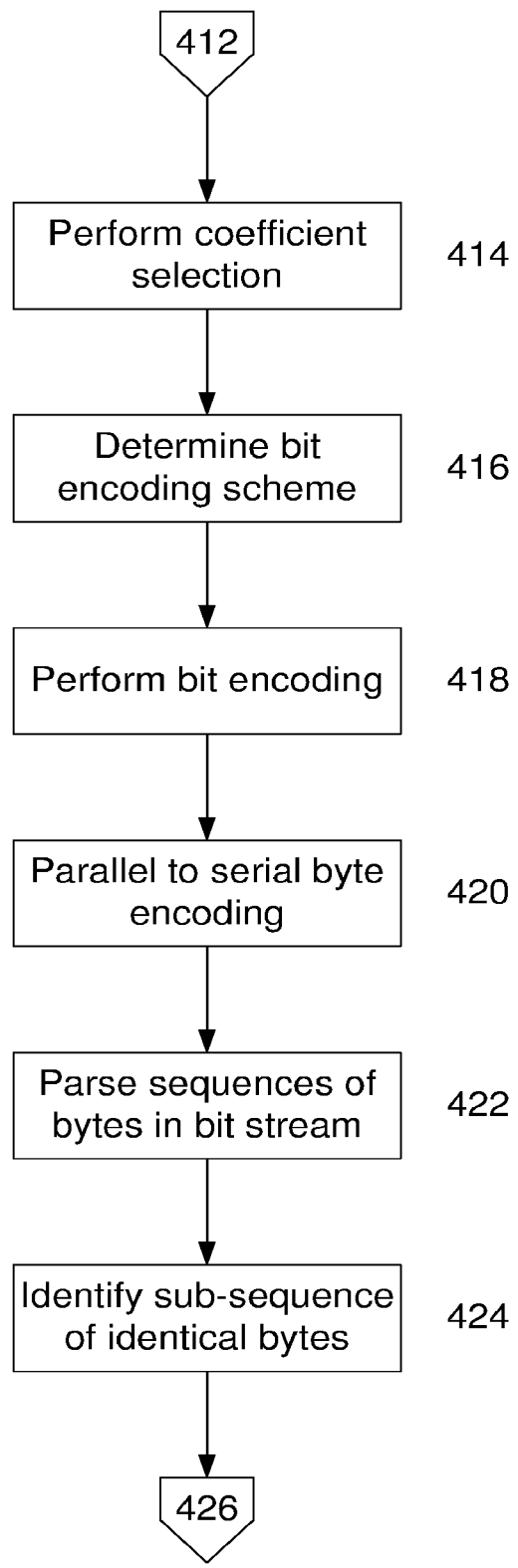
Figure 4C:
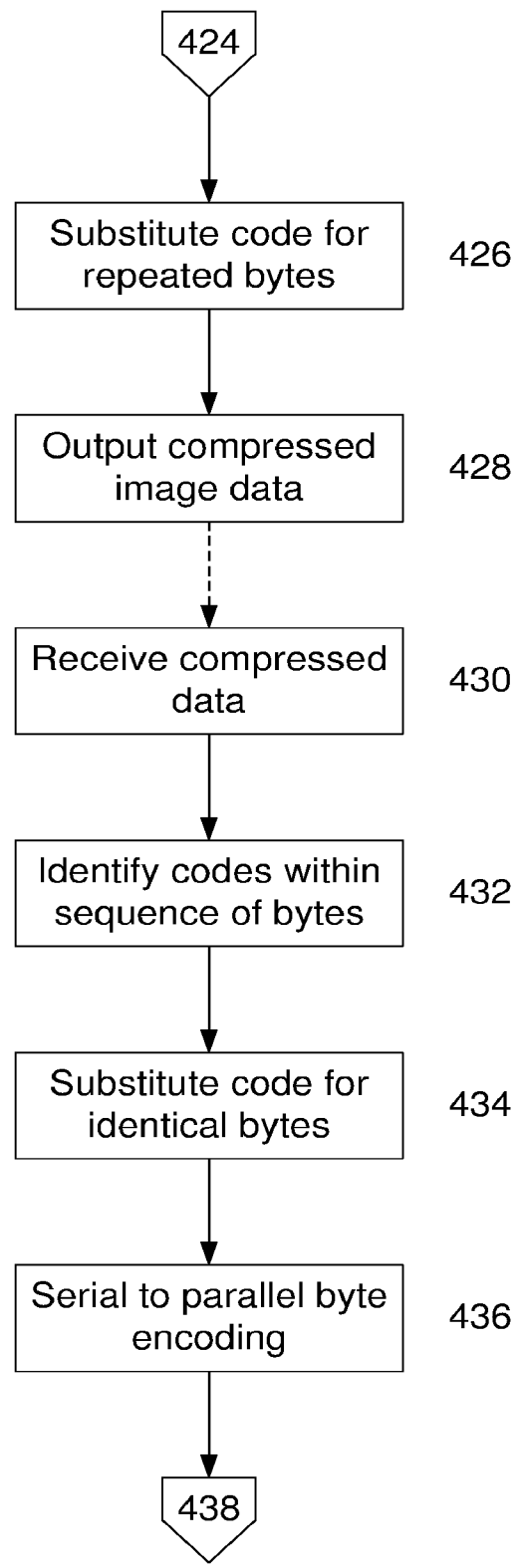
Figure 4D:
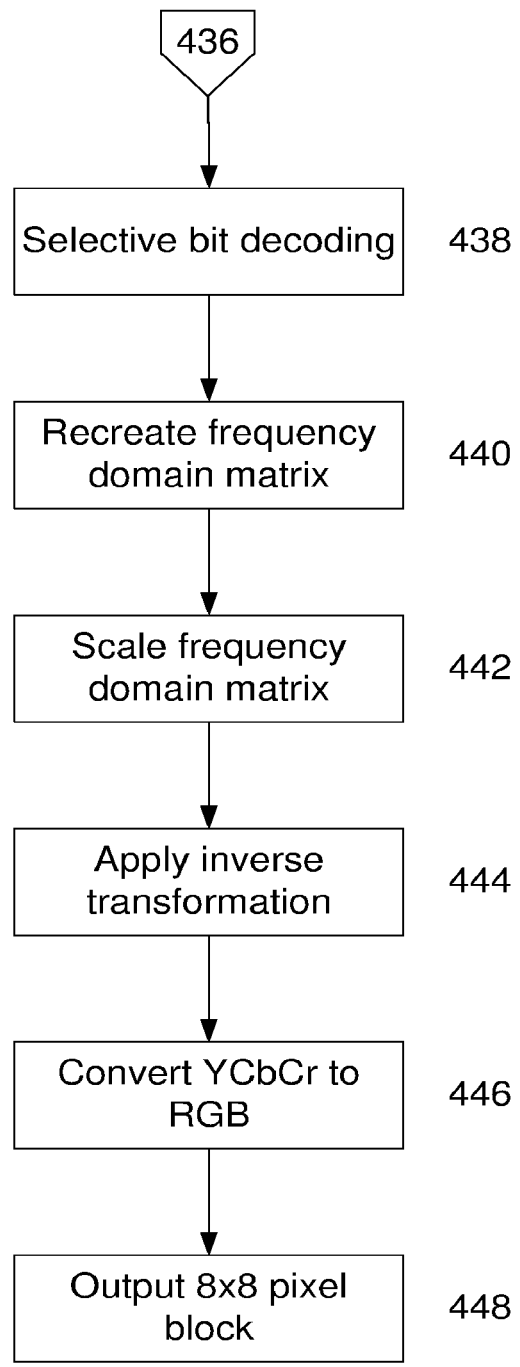

An example of the hardware configuration will now be described in more detail with reference to FIG. 3.

This example will be illustrated with respect to a separate hardware encoder and decoder, but it will be appreciated that this is not essential and the same techniques could be used in conjunction with integrated hardware. Furthermore, whilst reference to made to virtual reality applications, again this is not essential and the techniques could be used to apply to any circumstance in which image data is to be transferred, and in particular when image data is to be transferred using a limited bandwidth, whilst maintaining an acceptable image quality and desired latency, such as in virtual reality, augmented reality or telepresence applications.

In this example, the apparatus 300 again includes a processing system 310, encoder 320, decoder 330 and a display device 340, in the form of an HMD or similar. Each of these components will now be described in more detail.

In this example, the processing system 310 includes at least one microprocessor 311, a memory 312, an optional input/output device 313, such as a keyboard and/or display, and an external interface 314, interconnected via a bus 315 as shown. In this example the external interface 314 can be utilised for connecting the processing system 310 to peripheral devices, such as communications networks, storage devices, peripherals, or the like. Although a single external interface 314 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like.

In use, the microprocessor 311 executes instructions in the form of applications software stored in the memory 312 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed PC, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), an Application-Specific Integrated Circuit (ASIC), a system on a chip (SoC), a Graphics Processing Unit (GPU), Digital Signal Processing (DSP), or any other electronic device, system or arrangement.

Furthermore, whilst the processing system 310 is shown as a single entity, it will be appreciated that in practice the processing system 310 could be formed from multiple physical devices, which can optionally be distributed over a number of geographically separate locations, for example as part of a cloud based environment.

The encoder 320 typically includes an encoder input buffer 321, coupled in turn to an encoder processing device 322, an encoder output buffer 323, and a transceiver 324. A separate data buffer 325 can be provided coupled to the transceiver 324.

In use, image data, and in one particular example, video data is received and temporarily stored in the input buffer 321, before being passed to the encoder processing device 322 for compression. In this regard, the encoder input buffer typically buffers image data corresponding to a next seven rows of pixels of the image, and then a next eight pixels of the next row of pixels. This allows the encoder processing device 322 to obtain pixel data for a next 8×8 block of pixels from the buffered image data, and commence encoding.

Once this has been done a next eight pixels are buffered, with this being repeated until pixel data from the first eight rows of pixels has been obtained and is being encoded. This process is then repeated for subsequent rows of pixels in the image, until pixel data is acquired for the entire image, at which point a next image is processed in a similar manner. As a result of this approach, the encoder input buffer need never store more than seven rows and eight pixels of image data, reducing memory requirements. Additionally, as pixel data is acquired, this can be immediately processed using the encoding process, even before the next eight pixels of image data are buffered. This significantly reduces processing time and helps minimise overall latency.

The resulting compressed image data is then stored in the encoder output buffer 323, for example by sequentially reading in encoded bits, to thereby perform parallel to serial byte encoding, before being transferred to the decoder 330, via the transceiver 324. The transceiver 324 is also adapted to transfer other data, such as a sensor data received from the HMD 340, via the encoder data buffer 325.

The buffers 321, 323, 325 can be of any appropriate form of temporary storage, depending on the preferred implementation, and in one example can include high-performance FIFO (First-In-First-Out) field memory chips, or the like. The input buffer is typically connected to an HDMI port, display port output, or any other suitable video source, whilst the data buffer 335 is connected to a USB port, thereby allowing equivalent connection to the computer system.

The transceiver 324 can be of any appropriate form, but in one example allows for short range radio based communication 360 between the encoder and decoder, for example via a point to point direct WiFi™ connection, 60 GHz wireless technology, or the like.

The processing device 322 can be any device capable of performing the compression process described herein. The processing device 322 could include a generic processing device operating in accordance with software instructions stored in memory. However, in one example, in order to ensure a suitably quick compression time, the processing device includes custom hardware configured to perform the compression process. This could include, firmware optionally associated with implementing logic such as an FPGA (Field Programmable Gate Array), a Graphics Processing Unit (GPU), an Application-Specific Integrated Circuit (ASIC), a system on a chip (SoC), digitial signal processor (DSP), or any other electronic device, system or arrangement. In a preferred example, the encoder processing device 322 is configured to perform parallel processing of individual channels, of each DCT and parallel encoding of the individual frequency coefficients. Thus, whilst a single encoder processing device 322 is shown, in practice, a respective encoder processing device 322 could be provided for encoding each of the channels in parallel, or alternatively a GPU or other similar parallel processing architecture could be used. In the event that a channel, such as the Y channel, is not encoded, then the encoder processing device may simply introduce a delay in transmitting the respective data to the encoder output buffer 323, ensuring this is still synchronised with the encoded CbCr channels.

The decoder 330 typically includes a transceiver 334 coupled to a decoder input buffer 331, in turn coupled to a decoder processing device 332 and a decoder output buffer 333. A separate data buffer 335 can also be provided coupled to the transceiver 334.

In use, compressed image data is received from the encoder 320 via the transceiver 334, and temporarily stored in the input buffer 331, before being passed to the decoder processing device 332 for decompression. The resulting image data is then stored in the decoder output buffer 333, before being transferred to the display device 340. The transceiver 324 is also adapted to transfer other data, such as a sensor data received from the display device 340, via the decoder data buffer 335.

The buffers 331, 333, 335 can be of any appropriate form of temporary storage, depending on the preferred implementation, and in one example can include high-performance FIFO (First-In-First-Out) field memory chips, or the like. The output buffer is typically connected to an HDMI port, whilst the data buffer 335 is connected to a USB port, thereby allowing equivalent connection to the display device.

The transceiver 334 can be of any appropriate form, but in one example allows for short range radio based communication 360 between the encoder and decoder, for example via a point to point direct WiFi™ connection, 60 GHz wireless technology, or the like.

The processing device 332 could include a generic processing device operating in accordance with software instructions stored in memory. However, in one example, in order to ensure a suitably low decompression time, the processing device includes custom hardware configured to perform the decompression process. This could include, firmware optionally associated with implementing logic such as an FPGA (Field Programmable Gate Array), a Graphics Processing Unit (GPU), an Application-Specific Integrated Circuit (ASIC), a system on a chip (SoC), digitial signal processor (DSP), or any other electronic device, system or arrangement. In a preferred example, the decoder processing device 332 is configured to perform parallel processing of individual channels, of each DCT and parallel encoding of the individual frequency coefficients. Again, whilst a single decoder processing device 332 is shown, in practice, a respective encoder processing device 332 could be provided for encoding each of the channels in parallel, or alternatively a GPU or other similar parallel processing architecture could be used. In the event that a channel, such as the Y channel, is not encoded, then the decoder processing device may simply introduce a delay in transmitting the respective data to the decoder output buffer 333, ensuring this is still synchronised with the CbCr channels.

The display device 340 includes at least one microprocessor 341, a memory 342, an optional input/output device 343, such as a keypad or input buttons, one or more sensors 344, a display 345, and an external interface 346, interconnected via a bus 347 as shown.

The display device 340 can be in the form of HMD, and is therefore provided in an appropriate housing, allowing this to be worn by the user, and including associated lenses, allowing the display to be viewed, as will be appreciated by persons skilled in the art.

In this example, the external interface 347 is adapted for normally connecting the display device to the processing system 310 via a wired connection. Although a single external interface 347 is shown, this is for the purpose of example only, and in practice multiple interfaces using various methods (eg. Ethernet, serial, USB, wireless or the like) may be provided. In this particular example, the external interface would typically include at least a data connection, such as USB, and video connection, such as DisplayPort, HMDI, Thunderbolt, or the like.

In use, the microprocessor 341 executes instructions in the form of applications software stored in the memory 342 to allow the required processes to be performed. The applications software may include one or more software modules, and may be executed in a suitable execution environment, such as an operating system environment, or the like. Accordingly, it will be appreciated that the processing device could be any electronic processing device such as a microprocessor, microchip processor, logic gate configuration, firmware optionally associated with implementing logic such as an FPGA (Field Programmable Gate Array), a Graphics Processing Unit (GPU), an Application-Specific Integrated Circuit (ASIC), a system on a chip (SoC), digitial signal processor (DSP), or any other electronic device, system or arrangement.

The sensors 344 are generally used for sensing an orientation and/or position of the display device 340, and could include inertial sensors, accelerometers or the like. Additional sensors, such as light or proximity sensors could be provided to determine whether the display device is currently being worn, whilst eye tracking sensors could be used to provide an indication of a point of gaze of a user.

In one example, the display device could therefore be an existing commercial display device, such as an HTC Vive™, Oculus Rift™ or Playstation VR™ headset, although it will be appreciated that this is not essential and any suitable arrangement could be used.

An example of the operation of the image compression/decompression process will now be described in more detail.

For the purpose of this example, it is assumed that the processing systems 310 is executing applications software that generates content that is displayed on the display device 340, with the content being displayed dynamically based on sensor data from sensors 345 onboard the display device 340, and optionally other sensors, such as handheld controllers or position detection systems (not shown), as will be appreciated by persons skilled in the art.

Actions performed by the processing system 310 being performed by the processor 311 in accordance with instructions stored as applications software in the memory 312 and/or input commands received from a user via the I/O device 313, or other peripherals (not shown). Actions performed by the display device 340 are performed by the processor 341 in accordance with instructions stored as applications software in the memory 342.

The encoder 320 and decoder 340 act as interfaces between the processing system 310 and display device 340, allowing image data to be compressed, transmitted wirelessly, and then decompressed before being displayed on the display device 340, whilst also allowing sensor data or other input command data to be transferred back to the processing system. Actions performed by the encoder 320 and decoder 330 are typically performed by the respective processing device 322, 332, based on defined programming, and in one example a custom hardware configuration and/or instructions in embedded firmware.

However, it will be appreciated that the above described configuration assumed for the purpose of the following examples is not essential, and numerous other configurations may be used. For example, the functionality of the encoder and decoder could be inbuilt within the processing system 310 and display device 340 directly. Additionally, the compression techniques can be applied in a wide range of other scenarios, including compressing and decompressing images on one or more computer systems, without requiring the use of the separate display device. Nevertheless, the above arrangement is particularly beneficial for virtual or augmented reality applications, telepresence applications, or the like.

An example process of a method of compressing and subsequently decompressing image data will now be described in more details with reference to FIGS. 4A to 4D.

In this example, the encoder 320 receives image data, and in particular video data representing a sequence of images, from the processing system 310, and temporarily stores this in the encoder input buffer 321 at step 400 and 402. The image data is analysed, for example by parsing the data to identify flags within the data that delimit headers, identify the start of an image, or the like, allowing image data corresponding a next block of 8×8 pixels to be acquired at step 404. In this regard, when buffering the data, the encoder requires an initial 8×8 block of pixels from the image in order to commence processing. Accordingly, the encoder input buffer 321 is populated with the first seven lines of pixels of an image, as well as the first eight pixels of the eighth line of pixels, before processing can commence. As the next eight pixels are received, the next 8×8 block can be processed, with this being repeated until all pixels in the first eight rows of the image have been processed. Following this a next group of eight rows can be processed in a similar manner.

The image data is typically in the form of multi-channel RGB data, which is then converted by the processing device 322 to YCbCr luminance and chrominance channels at step 406. This process can be performed using a known mathematical coordinate transformations, and this will not therefore be described in further detail.

At step 408 a 2D DCT is applied to each of the luminance and chrominance channels, to thereby transform the channels into the frequency domain. This process can be performed using known techniques, and in a preferred example is performed by the processing device 322 in a highly parallel fashion to thereby reduce processing times. The result of the transformation process on each channel is an 8×8 matrix, having 64 frequency coefficients, representing the magnitude of different frequency components in the respective image channel.

At step 410, a scaling factor is applied to each matrix, for example by dividing each frequency coefficient by the scaling factor to thereby reduce the magnitude each frequency coefficient. The scaling factor could be of any value and may be different for different channels. As part of this process, the scaled frequency coefficients are generally rounded to integer or other set number of significant figures, thereby reducing the volume of data needed to encode the frequency coefficients. For example, a coefficient of 500 would require 9 bits to encode, whereas 50 requires only 6 bits, so applying a scaling factor of 10 can reduce the number of bits required to encode the respective frequency coefficients.

In this approach, it will be appreciated that lower value coefficients might be rounded to zero, for example with 4 being scaled to 0.4 and hence rounded to 0. Whilst this leads to a loss of information, this will tend to occur for higher frequency components, which are known to contribute less to the overall appearance of the image, and hence such losses are of limited impact.

After applying the scaling factor, selection rules are determined at step 412. The selection rules are used to allow some of the frequency components to be selected, so that others can be discarded at step 414. The selection is typically performed based on levels, defined as a hierarchy diagonally across the matrix, so that an 8×8 frequency domain matrix includes 15 levels having 1, 2, 3, 4, 5, 6, 7, 8, 7, 6, 5, 4, 3, 2, 1 coefficients respectively.

The levels that are discarded are typically the higher frequency components, which as mentioned above contribute less to the appearance of the image. The selection rules define which levels are discarded based on a wide range of factors, depending on the preferred implementation.

For example, chrominance channels typically contribute less to the appearance of the image that the luminance channel, so that more levels will typically be discarded for the chrominance as opposed to the luminance channel. Thus for example, for the luminance channel Y, levels 1 to 8 may be retained, corresponding to 36 frequency coefficients, as shown at 531 in FIG. 5, whereas for the chrominance channels Cb and Cr, levels 1 to 6 may be retained, corresponding to only 21 frequency coefficients, as shown in 532 and 533 in FIG. 5. It will be appreciated that this reduces the total number of frequency coefficients that need to be encoded from 192 to 78 across all three channels.

Selecting which levels are retained based on rules, allows the encoder and decoder to apply the same criteria when selecting which levels are retained, which in turn allows this to be performed adaptively in realtime. This in turn allows different levels to be selected based on other factors, such as the quality and or bandwidth of a communications channel between the encoder and decoder. Thus, if the bandwidth is reduced due to interference, fewer levels might be selected, which will result in a higher degree of compression. Whilst this will result in a reduction in image quality, in many applications, such as VR, the reduction in quality for some frames will be less noticeable than dropped frames or increased latency, and hence is a preferable outcome.

Other factors could include, but are not limited to movement, and in particular a rate of movement, of the display device, image display requirements, a target display resolution, a position of the array of pixels within the one or more images and a position of the array of pixels within the one or more images relative to a point of gaze of an observer of the one or more images. Further examples will be described in more detail below.

At step 416, a bit encoding scheme is determined, allowing the selected frequency coefficients to be selectively encoded using different numbers of bits at step 418. In this regard, as described above, a scaled frequency component may only require 6 bits to fully encode the coefficient. Accordingly, the bit encoded scheme is selected so that the number of bits used to encode the frequency coefficients varies for each level within the hierarchy. This is feasible as higher frequency components typically have a smaller magnitude and hence require less bits to be encoded.

In one example, the encoding scheme used for the luminance channel is different for the chrominance channel, with an example encoding scheme being shown in Table 1, below.

TABLE 1

| Level | No. Bits | |
|---|---|---|
| | Luminance Channel | Chrominance Channel |
| 1 | 8 | 6 |
| 2 | 6 | 4 |
| 3 | 6 | 4 |
| 4 | 4 | 3 |
| 5 | 4 | 2 |
| 6 | 3 | 2 |
| 7 | 3 | 0 |
| 8 | 2 | 0 |

Figure 5:
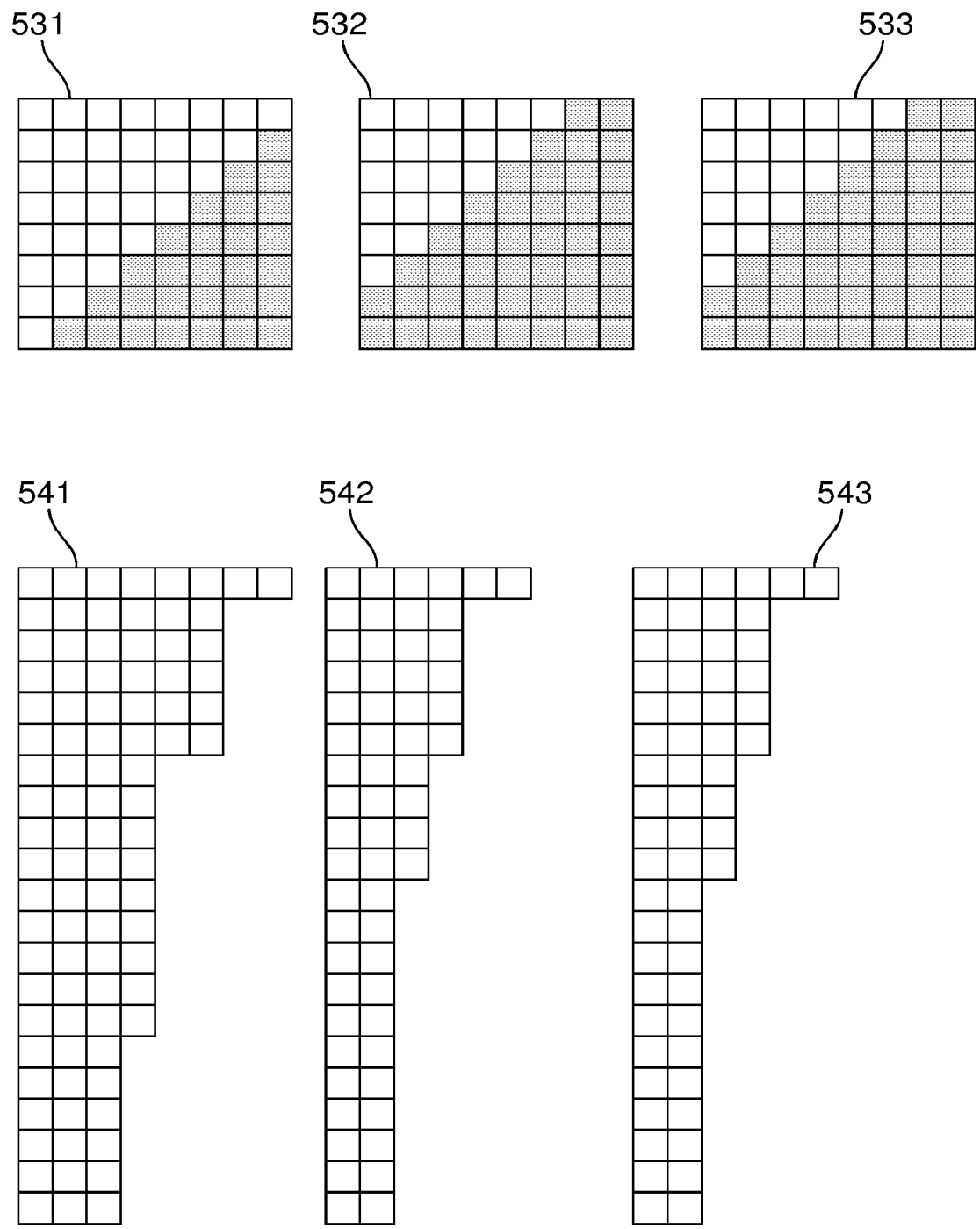
FIG. 5 is a schematic diagram illustrating aspects of the encoding process.

An example of this form of encoding for the first 6 levels of each of the three channels is shown in FIG. 5. Using this particular combination of selection rules and bit encoding scheme results in the luminance channel 541 being encoded with 129 bits, and each of the chrominance channels 542, 543 being encoded with 60 bits, resulting in all three channels of the 8×8 pixel array being encoded with just 249 bits. It will be apparent that this compares to the original uncompressed image data requiring 192 bytes, representing more than a six fold compression.

It will be appreciated from this that encrypting channels with 0 bits, effectively corresponds to discarding the channel, and so this can be used as an approach for selecting the coefficients that are encoded, by selecting an encoding scheme using the encoding rules, to thereby effectively combine steps 412 and 414 with 416 and 418.

Once the encoding has been performed, the bit encoded frequency components can be concatenated into a bit stream at step 420 by performing parallel to serial byte encoding, allowing this to be expressed as 32 bytes (256 bits). At step 422, the bytes are parsed to identify sub-sequences of identical bytes at step 424. Specifically, this approach is used to identify sub-sequences of three or more identical bytes, which can then be substituted for a code at step 426, without any loss of information.

In particular, for most images there are strings of zeros in the resulting encoded frequency coefficients, where the scaled coefficients have rounded to zero. Accordingly, these can be substituted by a code, which can be identified by the decoder, allowing the decoder to reinsert the sub-sequence of identical bytes.

Whilst the code could of any suitable form, in one example the code includes a header identifying that the particular byte is a code, and information corresponding to the value of and number of identical bytes. In a preferred arrangement a 2 byte code is combined using a Boolean OR operation with the number of zeros in a row (1-8). In one example, the number of zeros is represented as N-1, so that the numbers of 0-7 are ORed with the 2 byte code so that these only take up 3 bits of the second byte. For example, the code used can be (1111 1111; 1111 1000) with the second byte OR'ed with 0-7 depending on the number of zeros. It will be appreciated that similar approaches could be used for different values.

This approach works well as the encoding rarely results in consecutive numbers greater than or equal in value to 248, so the decoding algorithm can simply search for one byte having a value of 255 and a subsequent byte having a value greater than or equal to 248, identifying this as a code as opposed to encoded frequency components. This code is then replaced by bytes corresponding to the data with the number of a sequence of zeros represented by the last 3 bits of the second byte. This can lead to a further 19-25% reduction in data after the bit encoding stage based on testing to date.

Having performed code substitution, compressed image data can be output at step 428. Specifically, the compressed image data is typically stored in the output buffer 323 until sufficient data is present, at which time a data packet is created and transmitted to the encoder by the transceiver 324.

At step 430 the decoder 330 receives the compressed data via the transceiver 334, storing this in the decoder input buffer 331. The data is parsed at step 432 to identify codes within the data, as described above, with these being substituted with sub-sequences of repeated identical bytes at step 434 to thereby recreate the bit stream of bit encoded frequency coefficients.

At step 436, the decoder processing device 332 determines the bit encoding scheme used to encode the image data, using this to perform serial to parallel decoding of the bit stream, to thereby determine the encoded frequency coefficients at step 438. In particular, this allows the decoder processing device 332 to determine the number of bits used to encode each frequency coefficient, allowing the bit stream to be effectively segmented into individual encoded frequency coefficients. The individual frequency coefficients are used to recreate the scaled frequency matrix at step 440, with discarded frequency coefficients being generated using null values, to thereby populate the entire matrix, which is in turn scaled at step 442, based on the scaling coefficient.

At step 444 an inverse 2D DCT transform is applied, before the transformed matrix for each YCbCr channel is converted into RGB channels at step 446, allowing an 8×8 pixel block to be output at step 448, allowing this to be rendered by the display device 340.

Accordingly, the above described process allows significant reduction in the amount of image data required to encode each 8×8 block of pixels, and hence overall images. In particular, this is achieved using a combination of 2D DCT of YCbCr channels, selective bit encoding of resulting frequency coefficients and an optional final lossless coding scheme. Each channel can be processed in parallel, with the DCT being applied to the 8×8 array in a parallel approach. Furthermore, bit encoding of each of the frequency coefficients also happens in parallel, resulting in a massively parallel approach, allowing both compression and decompression to be performed in a rapid manner, resulting in minimal impact on latency, which is important in real-time applications, such as VR, AR and telepresence.

Figure 6:
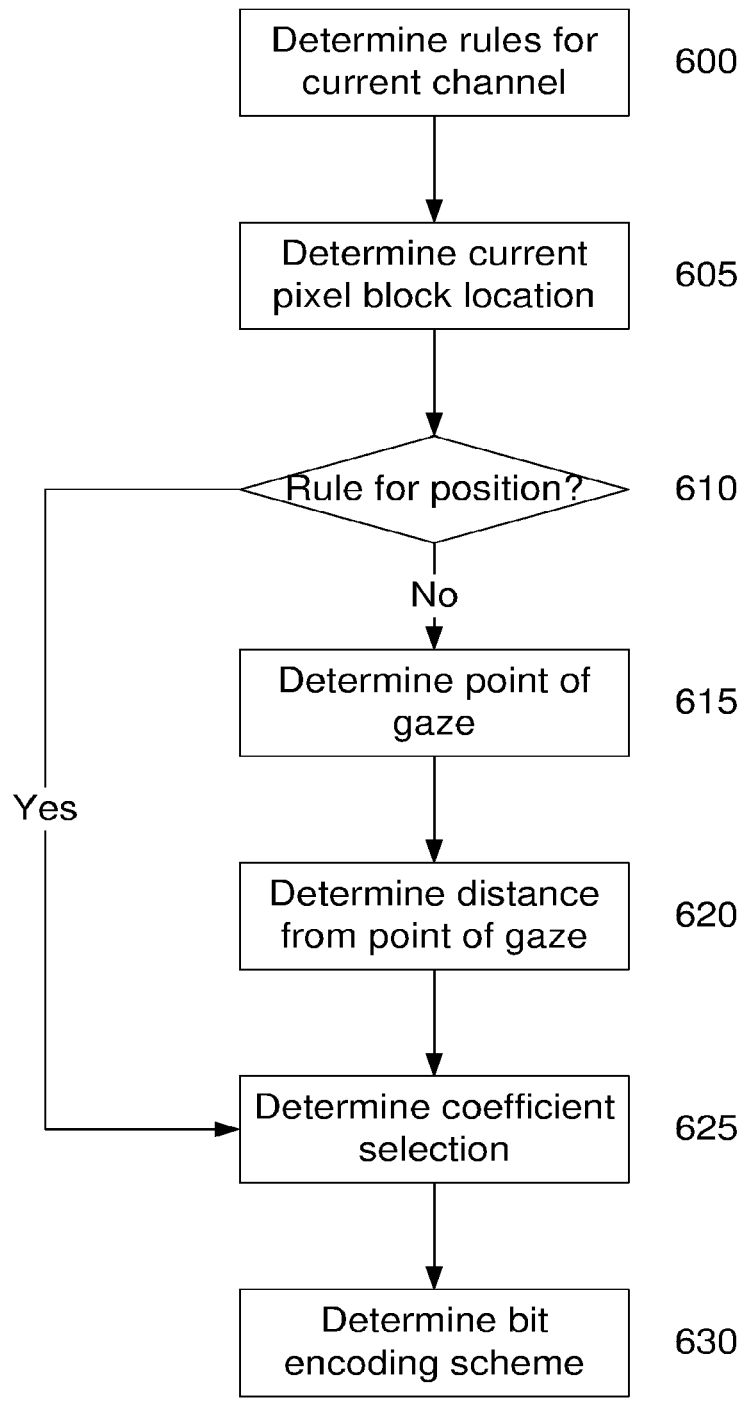
FIG. 6 is a flow chart of an example of a method of selecting a bit encoding scheme.
Figure 7:
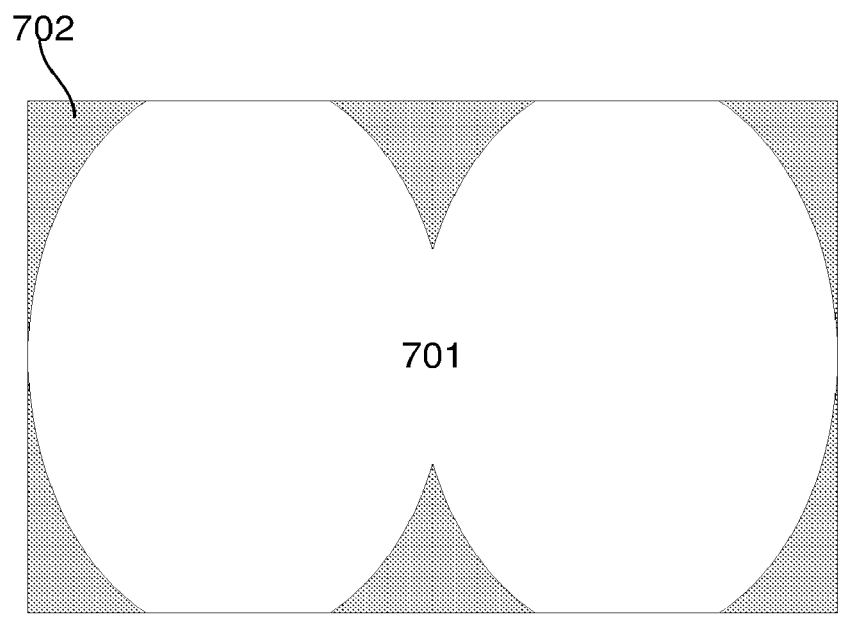
FIG. 7 is a schematic diagram of an example of an image to be encoded.

An example of an approach for implementing selection rules will now be described with reference to FIGS. 6 and 7.

In particular, this example focuses on how the spatial positioning of the pixel array within an image can be used to influence the selection process, and hence the amount of compression that is performed. Similar processes can be performed for other factors and these will not therefore be described in detail. This process is also identical for the encoder or decoder, and the description will focus on operation of the encoder for the purpose of ease of illustration only.

In this example, at step 600, the encoder processing device 322 determines selection rules for the current channel. In this regard, different rules typically apply for each of the luminance and chrominance channels as previously described. The encoder processing device 322 then determines the location of the pixel array within the image at step 605 and from this determines if there is an absolute rule associated with that position. In this regard, when an image is displayed using a headset, the lens arrangement typically means that portions of the image are not viewable. An example of this, is shown in FIG. 7, which shows viewable portions 701 and non-viewable portions 702 of an image. In this instance, if the pixel array is located in an unviewable portion 702, there is no need to encode the pixel array, and hence the process can simply discard all levels of the frequency coefficients. Accordingly, if a rule exists for the absolute position of the pixel array at step 610, the process proceeds to step 625, allowing a respective level selection to be determined and then used with a respective bit encoding scheme at step 630, as described above with respect to steps 414 to 418.

Otherwise, at step 615, the encoder processing device 322 determines a point of gaze of an observer of the image. This can be achieved using eye tracking sensing systems, as will be appreciated by persons skilled in the art. Once this has been determined, a relative position, and in one example a distance between the point of gaze and the current pixel array location is determined at step 620, with this being used to guide coefficient and/or bit encoding scheme determination at steps 625 and 630. In this regard, as an individual's peripheral vision does not perceive the same level of detail as their focal position, a greater degree of compression can be used further from the user's point of gaze.

In one example, a region of minimum compression can be defined surrounding the user's point of gaze, with the degree of compression increasing moving outwardly from the minimum region. The region can be of any shape and could be circular, elliptical, ovoid, or the like, depending on the particular circumstances. The region could also be off centred relative to the point of gaze, for example, so ensure minimum compression is used below the point of gaze, which is a region generally perceived with greater awareness by the user.

It will also be appreciated that in circumstances in which the user's point of gaze cannot be measured, this could be predicted. In general the prediction would be focused on a centre of the screen, but it will be appreciated that this is not essential and could be changed, for example based on factors such as the nature of the content being presented, a direction of headset movement or the like.

Thus, it will be appreciated that this describes a mechanism that allows selective encoding to be performed on the basis of either absolute and/or relative position of the pixel array within the image. By having each of the encoder and decoder execute the same algorithm for selecting the encoding scheme and selection used, this allows the decoder to reliably and accurately decompress the compressed image data, whilst still allowing encoding to be performed dynamically to maximise the overall level of compression, whilst minimising the perceived loss in image quality.

It will be appreciated that similar approaches could be used for other factors, such as transmission quality and/or bandwidth, thereby ensuring the degree of compression is optimised for the current circumstances.

Figure 8:
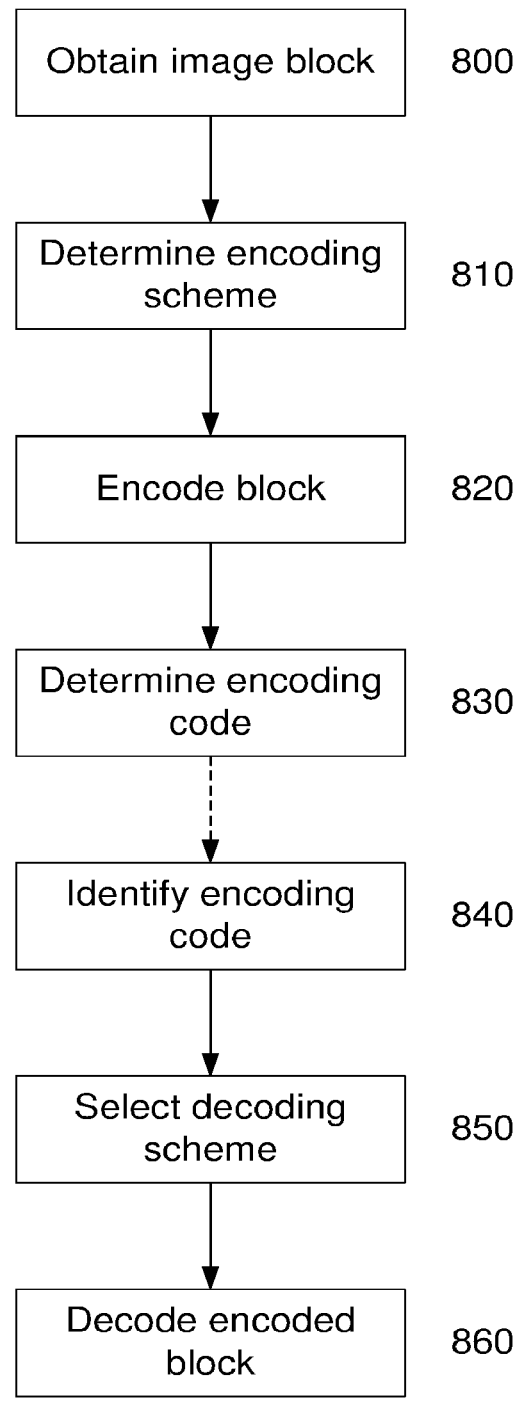
FIG. 8 is a flow chart of another example of an encoding/decoding scheme for compressing image data and decompressing compressed image data.

A further example of a method for compressing image data and subsequently decompressing compressed image data will now be described with reference to FIG. 8.

Whilst described as a stand-alone example, it will be understood from the following description that the current example can be used in conjunction with the above described compression/decompression technique in order to provide for further improved compression and computational efficiency. In particular, the above described techniques represent one of the options that can be employed within the following process, but it will also be appreciated that other compression techniques could be used as appropriate, depending on the circumstances.

In this example, at step 800 pixel data representing an array of pixels within the one or more images is obtained from image data. This can be achieved in any suitable manner, but typically involves buffering image data as this is received, until an array of pixels, such as an 8×8 array, has been obtained in a manner similar to that described above.

At step 810 an encoding scheme is determined, typically be selecting an encoding scheme from one or a number of previously defined encoding schemes, such as the encoding scheme described above with respect to FIGS. 1 to 7. The selection can be performed in any appropriate manner, such as through analysis of the image and/or pixel data, based on an image type associated with the image, based on instructions from an image source or display, or the like, and this is typically performed to provide a greater or lesser degree of compression, depending on the particular requirements of the current situation.

At step 820, the pixel data is encoded using the encoding scheme, for example using the techniques outlined above, or the like. At step 830, an encoding code indicative of the encoding scheme is for example through a look-up associated with the available schemes, with this being used together with the encoded block to generate compressed image data. In one example, this can be achieved by adding the encoded code as a prefix to the encoded pixel data, although other approaches could be used, including simply by replacing the pixel data with the encoding code, for example using a code word substitution, depending on the encoding scheme used.

Once the compressed image data has been created, this can then be transferred to a destination for example as part of a byte stream, allowing this to be decoded to generate image data.

This process is typically performed by determining the encoding code from the compressed image data at step 840. In this regard, the encoding code typically has a set format, such as a particular combination of bits, allowing this be easily identified within a received byte stream. The encoding code is then used to determine the encoding scheme used, typically through a look-up process at step 850. The identified encoding scheme can then be used to decode the compressed image data at step 860, for example using the approach outlined above with respect to FIGS. 1 to 7, to thereby generate pixel data representing the array of pixels within the one or more images.

Accordingly the above described process allows encoding to be performed using one of a number of encoding schemes. In a preferred example, the different encoding schemes are known in advance to both an encoder and a decoder, allowing these to be changed dynamically for each pixel array within the image that is being encoded/decoded. This ensures that the encoding scheme is optimised for the particular data being encoded, thereby maximising the compression that can be achieved, whilst ensuring that other desired properties, such as image quality and encoding time, are maintained.

A number of further features will now be described.

When encoding the image, the process typically involves determining the encoding scheme based on one or more of a range of different factors, including an image type of the image data, an encoding scheme indication received from an image data source or display, by analysing at least one of the image data and the pixel data, or based on compression requirements such as a required compression amount, a resulting image quality, a compression latency, or the like.

Thus, for example, a different type of encoding could be used when encoding photos as opposed to computer generated graphics, which often have quite different properties. The nature of the image could be obtained from metadata associated with the image, or based on properties of the image itself. Alternatively, an image source supplying the image data, such as a computer system supplying the image data for transfer to a display or other computing device, could specify the encoding scheme that should be used.

A further example is to analyse the pixel data to identify characteristics of the pixel array. For example, if the pixel array has a single colour, a different algorithm could be used to if the pixel array contains multiple colours. This is particularly useful for encoding large areas of an image that have a single colour, such as a sky or background, with this allowing a single encoding code indicative of the solid colour to be used to replace the pixel data for the entire pixel array, thereby resulting in a maximum amount of compression, with no effective loss in image quality.

A further example is the identification of gradients or boundaries, which can result in undesirable image artefacts using many image compression approaches, and hence may require an alternative compression approach.

In one preferred example, where the pixel array is not a solid colour, the approach outlined with respect to FIGS. 1 to 7 is used. In the event that the pixel array does not contain a gradient or boundary, the technique can involve encoding all three of the YCbCr channels. However, in the event that the pixel array contains a gradient or boundary, the Y channel could be passed through unencoded, so that additional luminance information is retained. Whilst this reduces the ultimate amount of compression obtained, the compression amount is still significant due to the compression of the CbCr channels, whilst the additional retained colour information can significantly improve the quality of the resulting image in the region of the gradient or boundary.

The selection could also be used to control other aspects of a compression algorithm. For example, this could be used to specify which frequency coefficients are retained in the above described compression process, in a manner similar to that performed with respect to the process of FIG. 6.

The encoding code is typically specified in the form of a number from 0 to 255, which can be defined by a single byte, and which allows a selection to be made from up to 256 different encoding schemes. This allows a wide range of different encoding schemes to be used, with these being assigned to a respect one of the numbers 0 to 255, so that a wide range of different encoding schemes can be used to thereby optimise the compression achieved for a desired image quality. In one particular example, it will be appreciated that industry standard lists of coding schemes could be established, thereby allowing encoding and decoding systems to interoperate even with no prior communication to establish the encoding schemes to be used.

In one particular example, the encoding code could be identified by preceding byte of a fixed format, such as "11111111", so that the encoding code used to select an encoding scheme assigned to the number 1 would be given by "1111111100000001". It will be appreciated that performing this allows the decoding process to easily identify the encoding process used. However, any suitable approach could be used and the above example is not intended to be limiting.

It will be appreciated that a similar approach is used when decoding the compressed image data, with the approach including substituting an encoding code for an array of pixels of a solid colour, or using the previously described decoding process.

It will also be appreciated that the image compression process could be performed using apparatus similar to that described above, and this will not therefore be described in any further detail.

Figure 9A:
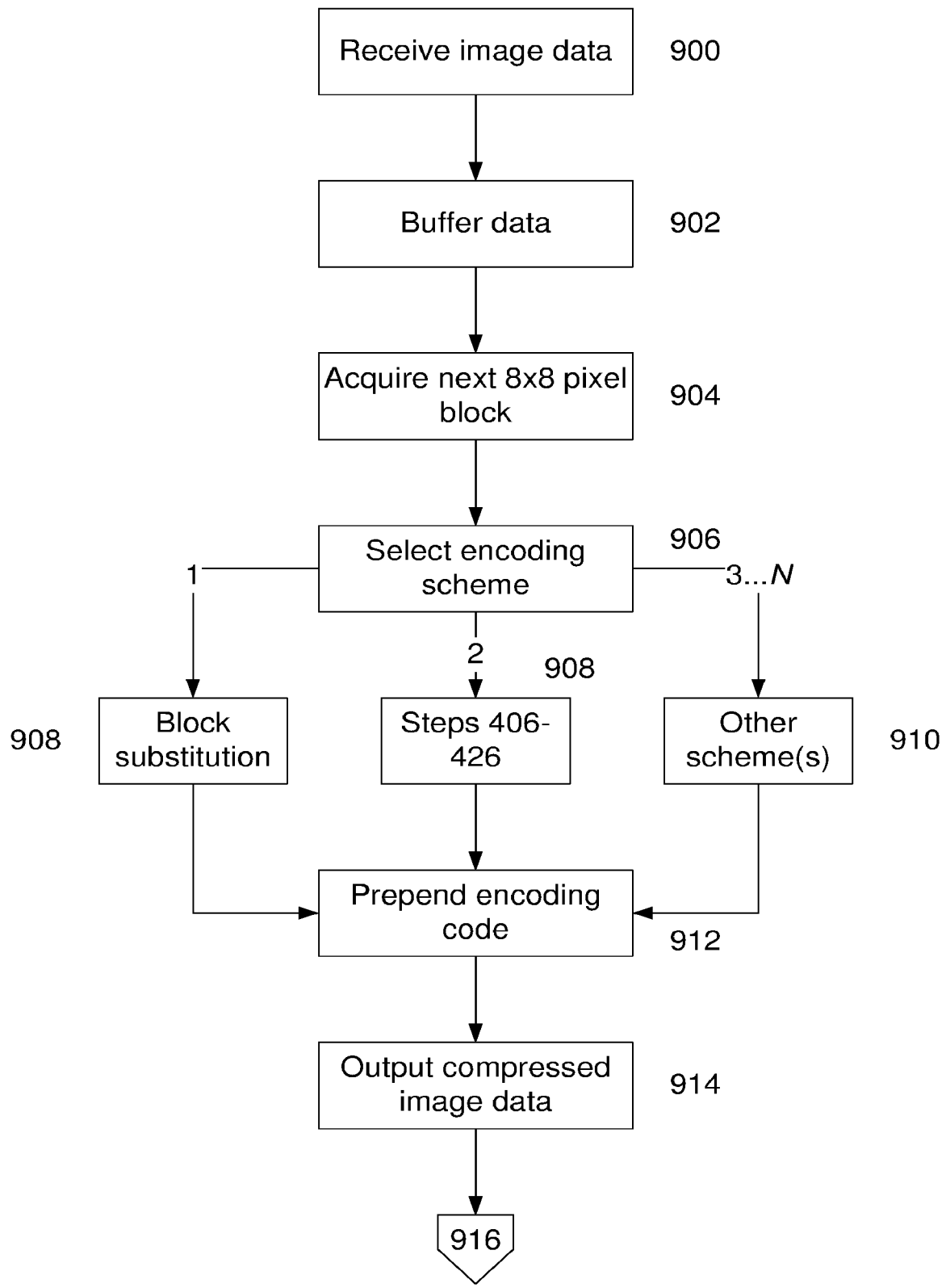
FIGS. 9A and 9B are a flow chart of a specific example of a method for compressing and subsequently decompressing image data using a selective encoding/decoding scheme; and, FIG. 10 is a flow chart of a further example of a method for compressing and subsequently decompressing image data.
Figure 9B:
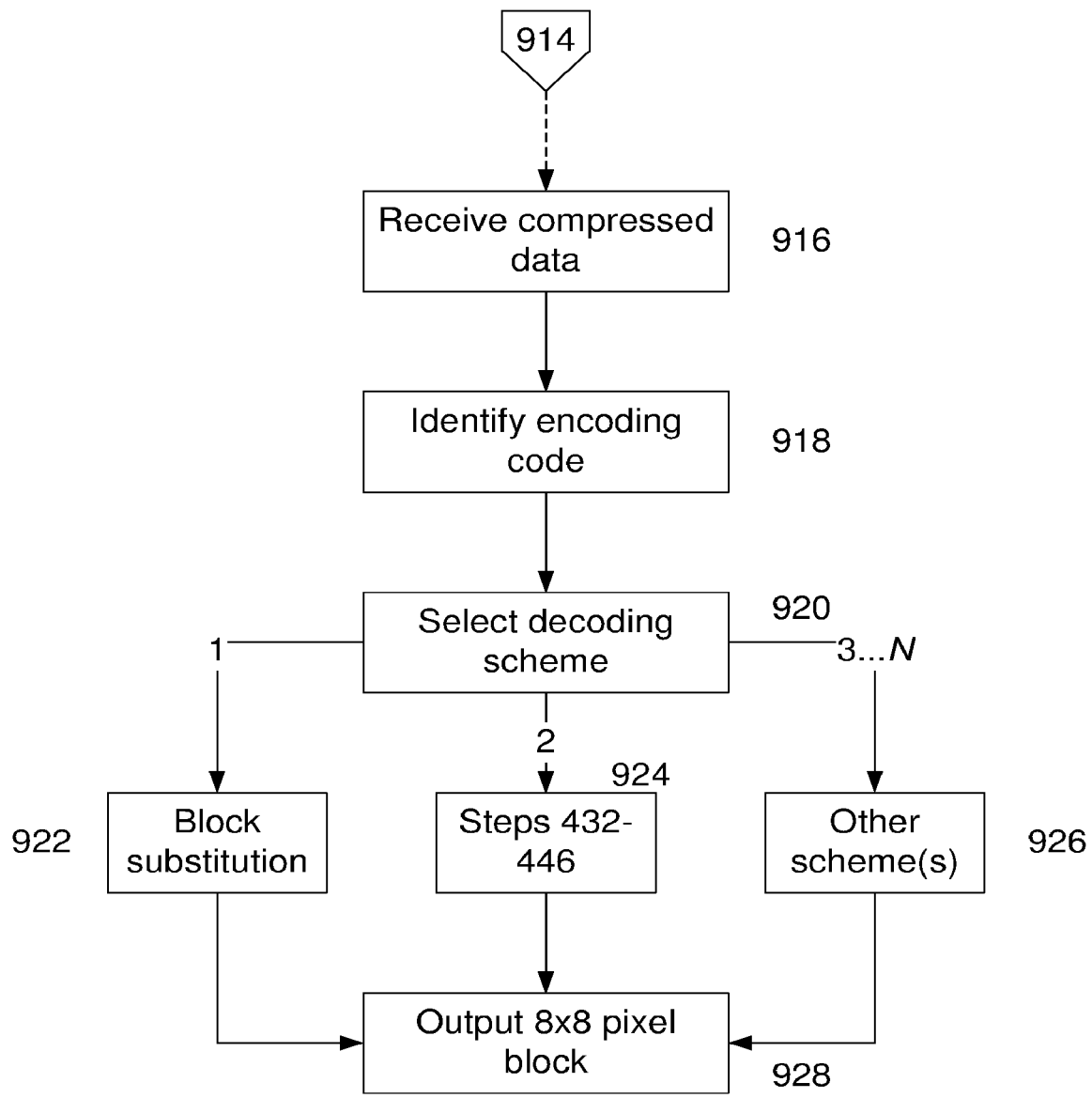

A further example process will now be described in more detail with reference to FIGS. 9A and 9B.

In this example, the encoder 320 receives image data at step 904, and in particular video data representing a sequence of images, from the processing system 310, and temporarily stores this in the encoder input buffer 321 at step 902. The image data is analysed, for example by parsing the data to identify flags within the data that delimit headers, identify the start of an image, or the like, allowing image data corresponding a next block of 8×8 pixels to be acquired at step 904. It will be appreciated that this corresponds to the steps 400 to 404 described above and this will not therefore be described in further detail.

At step 906, the encoder 920 selects an encoding scheme to be used. This can be performed either through analysis of the 8×8 pixel block, for example to determine if the block is a single colour, gradient, edge or the like, or could be based on information supplied by the image source.

In the example shown, the encoding schemes include a first encoding scheme for performing a block substitution at step 908, in which a single colour pixel block is replaced by a given predefined code. A second encoding scheme is provided at step 908, which in this example corresponds to the above described encoding scheme, and specifically to steps 406 to 426. However, it will be appreciated that any number N, of different schemes could be used, with other schemes being selected and used at step 910.

An encoding code representing the selected encoding scheme is prepended to the encoded data at step 912, with this being output as compressed image data at step 914.

Following this decoding can be performed by having the decoder 330 receive the compressed image data at step 916 and detected the presence of the encoding code at step 918, using this to select an appropriate decoding scheme at step 920. For example, this can include performing block substitution at step 922, replacing the predefined code with a single colour pixel block or could include performing the decoding process of steps 432-446 t step 924. Again, N suitable decoding schemes could be provided, with other schemes being selected and used at step 926 as required.

Finally, an 8×8 pixel block is output from the decoder at step 928.

It will be appreciated from this that the selection process performed at step 906 performs a classification function to be performed so that each pixel block can be assigned to a different encoding scheme. In one example, up to 256 different schemes can be defined, allowing third parties to introduce new compression/decompression schemes for the 8×8 pixel blocks within the previously described architecture. Furthermore, users can define particular classification schemes, so that for example different combinations of 256 schemes could be used for different circumstances, depending for example on the nature of the image content to be encoded, the requirements of the scenario, such as latency requirements, or the like.

This vastly increases the flexibility of the encoding that can be performed, and in particular allows individual encoding schemes to be selected dynamically using a classification process for each pixel block, thereby optimising the encoding to each block on a case by case basis. Furthermore, different classification schemes can be provided, with each different classification scheme allowing different combinations of encoding schemes to be accessed, thereby further increasing the flexibility, allowing users to ensure optimum encoding can be performed in a wide range of different scenarios.

Figure 10:
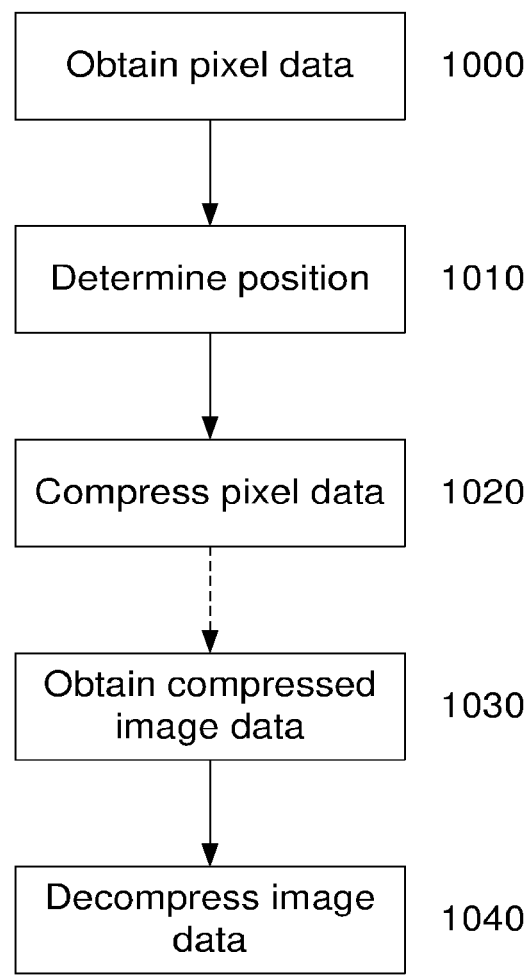

In another broad form the foveated compression scheme described above in FIGS. 6 and 7 can also be used in conjunction with different encryption schemes to provide a method of compressing image data from one or more images forming part of digital reality content, as will now be described with reference to FIG. 10.

In this example, the method includes obtaining pixel data from the image data at step 1000, the pixel data representing an array of pixels within the one or more images. This can be achieved in a manner similar to that outlined above.

A position of the array of pixels within the one or more images is determined relative to a defined position at step 1010, with the defined position being at least partially indicative of a point of gaze of the user. The defined position can be based on an actual measured point of gaze, or an expected or predicted point of gaze of the user, determined for example by assuming the user is staring at an approximate centre of the image, or based on the content, such as a point of focus within the image, movement of the headset, or the like. Additionally, the defined point can be offset from the point of gaze, for example positioning this below the point of gaze to take account of the fact that individuals tend to focus slightly below the point of gaze to avoid colliding with obstacles when walking.

Following this, the pixel data is compressed at step 1020 to generate compressed image data, with the compression being performed at least partially in accordance the determined position, so that a degree of compression depends on the determined position of the array of pixels.

It will be appreciated that similarly a decompression process can be performed that involves obtaining compressed image data at step 1030, the compressed image data representing an array of pixels within the one or more images and being compressed at least in part based on a position of the array of pixels within the one or more images relative to a defined position, the defined position being at least partially indicative of a point of gaze of the user and decompressing the compressed image data at least partially in accordance the determined position at step 1040.

Thus, this provides a mechanism for compressing and subsequently decompressing the image, with the compression being controlled based on the location of an array of pixels relative to a defined point, which is in turn at least partially based on either a predicted or measured point of gaze of the user. Specifically this allows a degree of compression to be selected based on the position of the array of pixels, so that, less compression can be used in a region proximate the point of gaze, whilst greater compression is used further from the point of gaze, for example in the users peripheral field of view. This in effect provides foveated compression, allowing greater overall compression to be achieved, without a perceptible loss in quality, by increasing the compression in the user's peripheral field of view where a reduced quality of image is less noticeable.

It will be appreciated that this process can be used in conjunction with the compression processes outlined above, for example allowing different compression schemes to be selected based on the position of the array of pixels and allowing the above described bit encoding schemes to be used. However, this is not essential and any suitable compression scheme could be used, such as wavelet compression, adaptive sampling, or the like.

In any event, a number of further features will now be described.

In one example, the defined position is one of a measured point of gaze of the user, an expected point of gaze of the user, offset from a measured point of gaze of the user, offset from an expected point of gaze of the user and determined at least partially in accordance with gaze data indicative of a point of gaze of the user, the gaze data being obtained from a gaze tracking system. Thus, the defined point can be based on a measured or predicted point of gaze and may be offset, such as below the point of gaze, in order to optimise the degree of compression, without inducing a perceived reduction in image quality.

The degree of compression can be based on a distance from the defined point, for example progressively decreasing further from the point of gaze, but can also be based on a direction relative to the defined point, so that compression is greater above or below the defined point. It will be appreciated that this allows a respective degree of compression to be used in regions having any arbitrary shape positioned relative to the point of gaze, and that this could be configured depending on the particular circumstances and/or nature of the content being compressed. For example, this allows an elliptical, ovoid, or heart shaped region surrounding the defined point to have a reduced amount of compression compared to peripheral regions, to thereby maximise the image quality in regions where the user's perception of any compression artefacts will be greater.

In one example, the method includes selecting one of a plurality of encoding schemes and encoding the pixel data using the selected encoding scheme. Thus, it will be appreciated that this allows the foveated compression to be performed in conjunction with a technique similar to that described in FIGS. 8 and 9, with the encoding scheme used being selected based on the position of the array of pixels. Thus, in one example, each encoding scheme provides a respective degree of compression, and wherein the method includes selecting the encoding scheme at least in part depending on a desired degree of compression and/or the position of the array of pixels.

The process can also involve determining an encoding code indicative of the encoding scheme used and generating compressed image data using the encoding code and encoded pixel data, allowing this to be used in decoding the compressed image data. However, this is not essential and alternatively the decompression process can involve determining the encoding scheme used using similar criteria, such as the position of the array of pixels and hence the degree of compression required.

In one example, the encoding scheme uses an approach similar to that outlined above with respect to FIG. 1, in which case image data is compressed by applying a transformation to the pixel data to determine a set of frequency coefficients indicative of frequency components of the array of pixels, selectively encoding at least some of the frequency coefficients using a bit encoding scheme to thereby generate a set of encoded frequency coefficients and generating compressed image data using the encoded frequency coefficients. It will be appreciated however that any one or more suitable compression techniques could be used, such as JPEG or the like.

In the preferred example, as in the case of FIG. 1 above, the bit encoding scheme defines the number of bits used to encode each of the frequency coefficients so that at least some of the encoded frequency coefficients have different numbers of bits. More typically a smaller number of bits are used to encode frequency coefficients corresponding to higher frequencies and a preferably a progressively smaller number of bits are used to encode frequency coefficients corresponding to progressively higher frequencies. In one example, at least some frequency coefficients are discarded (effectively encoding these with zero bits) so that the set of encoded frequency coefficients is smaller than the set of frequency coefficients and with these typically corresponding to higher frequencies.

In one example, the method includes selecting one of a plurality of bit encoding schemes and encoding the frequency coefficients in accordance with the selected bit encoding scheme. Thus, it will be appreciated that the different encoding schemes could correspond to the encoding scheme of FIG. 1, with different bit encoding schemes being used to encode different frequency coefficients with respective different numbers of bits to thereby provide different degrees of compression.

Thus, it will be appreciated that the bit encoding scheme can be selected at least in part depending on a desired degree of compression and/or the position of the array of pixels. This, can in turn depend on other factors, such as the position of the array of pixels, a transmission bandwidth of a communications link used to transmit the compressed image data, a transmission quality of service of a communications link used to transmit the compressed image data, movement of a display device, image display requirements, a target display resolution, a channel being processed, error metrics, or the like. As previously described, this allows for the ability to dynamically adjust the compression to help optimise the compression and obtain the best possible image quality for the current circumstances.

In one example, the frequency components are arranged in a plurality of levels and wherein each bit encoding scheme defines a respective number of bits to be used to encode the frequency coefficients in each of the plurality of levels. In particular, where the array is an N×N array of pixels, this results in 2N-1 levels of frequency components, with the components in each level being encoded with a respective number of bits.

As previously described the method can include applying a scaling factor in a manner similar to that described above.

The image data typically defines a plurality of channels, in which case the method includes selectively encoding frequency coefficients for each channel. For example, the pixel data can define RGB channels, which are converted into YCbCr channels, which are then transformed as previously described. This process can involve selectively encoding more frequency coefficients for the Y channel than the Cb or Cr channels, selectively encoding frequency coefficients for the YCbCr channels in parallel and/or selectively encoding frequency coefficients for the CbCr channels and using the Y channel, so that the Y channel is effectively uncompressed.

In one example, the transformation is a 2-D discrete cosine transformation.

The method also typically includes buffering the image data to obtain the pixel arrays, for example by buffering n-1 rows of pixels, and a next n pixels of the next row of pixels to form a first n×n block of pixels. Successive blocks are then buffered as previously described, with the number of pixels in each block optionally being controlled based on a selected bit encoding scheme, a desired degree of compression and/or the position of the array of pixels.

Frequency coefficients are typically encoded in parallel, with the compressed image data being generated by parallel to serial byte encoding, although other suitable approaches could be used.

Similar approaches can be used for decoding the compressed image data.

For example, decoding the compressed image data can include selecting one of a plurality of decoding schemes and decoding the pixel data using the selected decoding scheme, with the selection being based on a desired degree of compression, a position of the array of pixels or an encoding code in the compressed image data.

The method can involve using a decompression scheme similar to that outlined above, which can use one of a plurality of bit encoding schemes to provide a different degree of compression, by encoding a respective number of bits for the frequency coefficients in each of a plurality of levels.

A scaling factor can be applied to at least some of the frequency coefficients so that scaled encoded frequency coefficients are decoded, with the scaling factor being used to increase a magnitude of each frequency coefficient. Again, different scaling factors can be applied to at least some encoded frequency coefficients, or the same scaling factor is applied to each encoded frequency coefficient. In either case, different scaling factors can be applied to encoded frequency coefficients in different channels.

A plurality of channels can be used, with each of these being decoded as required, with this optionally being performed in parallel by using serial to parallel byte decoding and selectively decoding frequency coefficients in parallel.

The desired degree of compression for the above techniques can be based on any one or more of the position of the array of pixels, a transmission bandwidth of a communications link used to transmit the compressed image data, a transmission quality of service of a communications link used to transmit the compressed image data, movement of a display device, image display requirements, a target display resolution, a channel being processed or error metrics.

The techniques can be used for transmitting digital reality content, including any one or more of augmented reality, virtual reality, mixed reality, telepresence or the like. This can include transmitting the image data from a computing device to a wearable digital reality headset via a communication network and/or a wireless communications link.

Accordingly, the above described processes allow for significant image compression, without adversely effecting latency, allowing for the techniques to be used in providing wireless connections to virtual or augmented reality wearable displays using existing hardware, whilst also allowing for improved image compression to be achieved more broadly in other applications.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A method of compressing image data representing one or more images, the method including:
   a) obtaining pixel data from the image data, the pixel data representing an array of pixels within the one or more images;
   b) applying a transformation to the pixel data to determine a set of frequency coefficients indicative of frequency components of the array of pixels;
   c) selecting one of a plurality of bit encoding schemes, wherein each of the plurality of bit encoding schemes selectively encodes different frequency coefficients with respective different numbers of bits to provide a different degree of compression and wherein the bit encoding scheme is selected at least in part based on at least one of:
      i) a transmission bandwidth of a communications link used to transmit the compressed image data;
      ii) a transmission quality of service of a communications link used to transmit the compressed image data; and,
      iii) error metrics indicative of errors in the transmission of data;
   d) selectively encoding at least some of the frequency coefficients using the selected bit encoding scheme to thereby generate a set of encoded frequency coefficients, wherein the bit encoding scheme defines the number of bits used to encode each of the frequency coefficients so that when the frequency coefficients are selectively encoded:
      i) at least some of the encoded frequency coefficients are encoded with a different numbers of bits; and,
      ii) at least one frequency coefficient is discarded so that the set of encoded frequency coefficients is smaller than the set of frequency coefficients; and,
   e) generating compressed image data using the encoded frequency coefficients.

2. A method according to claim 1, wherein the method includes selecting the bit encoding scheme based on at least one of:
   a) a lens arrangement of a display device;
   b) movement of a display device;
   c) image display requirements of a display device;
   d) a target display resolution of a display device;
   e) a channel being processed; and
   f) a position of the array of pixels within the one or more images.

3. A method according to claim 1, wherein the frequency coefficients are selectively encoded so that at least one of:
   a) a number of bits used to encode each frequency coefficient is defined irrespective of the value of the respective frequency coefficient;
   b) a smaller number of bits are used to encode frequency coefficients corresponding to higher frequencies;
   c) a progressively smaller number of bits are used to encode frequency coefficients corresponding to progressively higher frequencies;
   d) at least one frequency coefficient is discarded corresponding to higher frequencies.

4. A method according to claim 1, wherein the method includes applying a scaling factor to at least some of the frequency coefficients so that scaled frequency coefficients are encoded and wherein at least one of:
   a) different scaling factors are applied to at least some frequency coefficients;
   b) the same scaling factor is applied to each frequency coefficient; and,
   c) the scaling factor is used to reduce a magnitude of each frequency coefficient.

5. A method according to claim 1, wherein the frequency components are arranged in a plurality of levels and wherein each bit encoding scheme defines a respective number of bits to be used to encode the frequency coefficients in each of the plurality of levels.

6. A method according to claim 1, wherein the image data defines a plurality of channels, and wherein the method includes selectively encoding frequency coefficients for each channel by:
   a) converting the RGB channels into YCbCr channels; and,
   b) transforming the YCbCr channels by selectively encoding more frequency coefficients for the Y channel than the Cb or Cr channels.

7. A method according to claim 1, wherein the method includes obtaining pixel data from image data by:
   a) buffering image data corresponding to a next n-1 rows of pixels of the image;
   b) buffering image data for a next n pixels of the next row of pixels;
   c) obtaining pixel data for a next n×n block of pixels from the buffered image data;
   d) repeating steps b) and c) until pixel data has been obtained from all of the n rows of pixels; and,
   e) repeating steps a) to d) until pixel data has been obtained from each row of pixels of the image.

8. A method according to claim 1, wherein the method includes:
   a) selectively encoding frequency coefficients in parallel; and,
   b) generating compressed image data at least in part by parallel to serial byte encoding.

9. A method according to claim 1, wherein the method includes at least one of:
   a) changing the selected bit encoding scheme to adjust the degree of compression dynamically;
   b) if compression artefacts exceed a threshold compression selecting a bit encoding scheme to reduce compression; and,
   c) if available transmission bandwidth falls, compression can be increased.

10. A method of decompressing compressed image data representing one or more images, the method including:
   a) obtaining compressed image data;
   b) determining a selected one of a plurality of bit encoding schemes, wherein each of the plurality of bit encoding schemes selectively encodes different frequency coefficients with respective different numbers of bits to provide a different degree of compression, wherein the bit encoding scheme was selected at least in part based on at least one of:
      i) a transmission bandwidth of a communications link used to transmit the compressed image data;
      ii) a transmission quality of service of a communications link used to transmit the compressed image data; and,
      iii) error metrics indicative of errors in the transmission of data;
   c) decoding the encoded frequency coefficients in accordance with the selected bit encoding scheme by:
      i) determining a set of encoded frequency coefficients from the compressed image data in accordance with the selected bit encoding scheme;
      ii) performing bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients; and,
      iii) applying an inverse transformation to the set of frequency coefficients to determine pixel data representing an array of pixels within the one or more images.

11. A method according to claim 10, wherein the method includes selecting the bit encoding scheme based on at least one of:
   a) a lens arrangement of a display device;
   b) movement of a display device;
   c) image display requirements of a display device;
   d) a target display resolution of a display device;
   e) a channel being processed; and
   f) a position of the array of pixels within the one or more images.

12. A method according to claim 1, wherein the image data is indicative of a digital reality including is-at least one of:
   a) augmented reality;
   b) virtual reality; and,
   c) mixed reality.

13. A method according to claim 1, wherein the method is used for displaying image data in a wearable digital reality headset by receiving the compressed image data from a computing device via a wireless communications link.

14. A method according to claim 1, wherein the method is used for at least one of:
   a) transmitting virtual reality video data; and,
   b) wirelessly transmitting virtual reality video data.

15. Apparatus for compressing image data representing one or more images, the apparatus including at least one electronic encoder processing device that:

a) obtains pixel data from the image data, the pixel data representing an array of pixels within the one or more images;
b) applies a transformation to the pixel data to determine a set of frequency coefficients indicative of frequency components of the array of pixels;
c) selects one of a plurality of bit encoding schemes, wherein each of the plurality of bit encoding schemes selectively encodes different frequency coefficients with respective different numbers of bits to provide a different degree of compression and wherein the bit encoding scheme is selected at least in part based on at least one of:
  i) a transmission bandwidth of a communications link used to transmit the compressed image data;
  ii) a transmission quality of service of a communications link used to transmit the compressed image data; and,
  iii) error metrics indicative of errors in the transmission of data;
d) selectively encodes at least some of the frequency coefficients using the selected bit encoding scheme to thereby generate a set of encoded frequency coefficients, wherein the bit encoding scheme defines the number of bits used to encode the frequency coefficients, and wherein the frequency coefficients are selectively encoded so that:
  i) at least some of the encoded frequency coefficients have different numbers of bits; and,
  ii) at least one frequency coefficient is discarded so that the set of encoded frequency coefficients is smaller than the set of frequency coefficients; and,
e) generates compressed image data using the encoded frequency coefficients.

16. Apparatus according to claim 15, wherein the apparatus includes:
a) an encoder input buffer that receives the image data;
b) an encoder output buffer that stores compressed image data; and,
c) an encoder transmitter that transmits the image data from the encoder output buffer.

17. Apparatus according to claim 15, wherein the at least one encoder processing device includes:
a) a suitably programmed field programmable gate array;
b) an Application-Specific Integrated Circuit; and,
c) a Graphics Processing Unit.

18. Apparatus according to claim 15, wherein the pixel data defines a plurality of channels, and wherein the apparatus includes:
a) a respective processing device for each channel; and,
b) a parallel processing device for processing each channel in parallel.

19. Apparatus according to claim 15, wherein the apparatus includes an encoder in wireless communication with a decoder allowing image data to be transferred between the encoder and decoder as compressed image data, wherein the encoder is at least one of coupled to and part of a suitably programmed processing system, and wherein the decoder is at least one of coupled to and part of a wearable display device.

20. Apparatus for decompressing compressed image data representing one or more images, the apparatus including at least one electronic decoder processing device that:
a) obtains compressed image data;
b) determines a set of encoded frequency coefficients from the compressed image data in accordance with a bit encoding scheme that defines the number of bits used in each encoded frequency coefficient;
c) determines a selected one of a plurality of bit encoding schemes, wherein each of the plurality of bit encoding schemes selectively encodes different frequency coefficients with respective different numbers of bits to provide a different degree of compression, wherein the bit encoding scheme was selected at least in part based on at least one of:
  i) a transmission bandwidth of a communications link used to transmit the compressed image data;
  ii) a transmission quality of service of a communications link used to transmit the compressed image data; and,
  iii) error metrics indicative of errors in the transmission of data;
d) decodes the encoded frequency coefficients in accordance with the selected bit encoding scheme by:
  i) performing bit decoding of the encoded frequency coefficients in accordance with the selected bit encoding scheme to thereby generate a set of frequency coefficients, wherein at least one frequency coefficient is generated so that the set of encoded frequency coefficients is smaller than the set of frequency coefficients; and,
  ii) applying an inverse transformation to the set of frequency coefficients to determine pixel data representing an array of pixels within the one or more images.

* * * * *